(12) United States Patent
Miess

(10) Patent No.: US 9,533,398 B2
(45) Date of Patent: Jan. 3, 2017

(54) POSITIVE RELIEF FORMING OF POLYCRYSTALLINE DIAMOND STRUCTURES AND RESULTING CUTTING TOOLS

(71) Applicant: US SYNTHETIC CORPORATION, Orem, UT (US)

(72) Inventor: David P. Miess, Highland, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 39 days.

(21) Appl. No.: 14/463,587

(22) Filed: Aug. 19, 2014

(65) Prior Publication Data

US 2016/0052108 A1 Feb. 25, 2016

(51) Int. Cl.
*B24D 3/00* (2006.01)
*B24D 3/02* (2006.01)
*B24D 11/00* (2006.01)
*B24D 18/00* (2006.01)
*C09K 3/14* (2006.01)

(52) U.S. Cl.
CPC ................. *B24D 18/0009* (2013.01)

(58) Field of Classification Search
USPC .......................... 51/309, 293, 307
See application file for complete search history.

(56) References Cited

U.S. PATENT DOCUMENTS

| 5,031,484 | A | 7/1991 | Packer |
| 6,062,326 | A * | 5/2000 | Strong ............... E21B 7/20 |
| | | | 166/242.8 |
| 6,158,304 | A | 12/2000 | Packer et al. |
| 6,338,754 | B1 | 1/2002 | Cannon et al. |
| 7,598,107 | B1 * | 10/2009 | Liu ................ B81C 99/0085 |
| | | | 257/E21.603 |
| 7,806,206 | B1 | 10/2010 | Miess |
| 7,866,418 | B2 | 1/2011 | Bertagnolli et al. |
| 8,052,765 | B2 | 11/2011 | Cho et al. |
| 8,074,566 | B1 | 12/2011 | Bach |
| 8,316,969 | B1 | 11/2012 | Bertagnolli et al. |
| 8,323,367 | B1 | 12/2012 | Bertagnolli et al. |
| 8,596,387 | B1 | 12/2013 | Sani et al. |
| 2008/0247899 | A1 * | 10/2008 | Cho ..................... B22F 5/08 |
| | | | 419/10 |

(Continued)

FOREIGN PATENT DOCUMENTS

| EP | 0132652 | 5/1993 |
| WO | WO 2012/171915 | 12/2012 |

OTHER PUBLICATIONS

International Search Report and Written Opinion from International Application No. PCT/US2015/045704 mailed Nov. 19, 2015.

(Continued)

*Primary Examiner* — James McDonough
(74) *Attorney, Agent, or Firm* — Dorsey & Whitney LLP

(57) ABSTRACT

Embodiments of the invention relate to methods of making articles having portions of polycrystalline diamond bonded to a surface of a substrate and polycrystalline diamond compacts made using the same. In an embodiment, a molding technique is disclosed for forming cutting tools comprising polycrystalline diamond portions bonded to the outer surface of a substrate.

6 Claims, 15 Drawing Sheets

(56) References Cited

U.S. PATENT DOCUMENTS

2010/0270087 A1* 10/2010 Marvel ................... E21B 10/43
                                                          175/426
2011/0171414 A1*  7/2011 Sreshta .................. C22C 26/00
                                                          428/64.1
2012/0324801 A1* 12/2012 Fang ........................ B01J 3/062
                                                          51/309

OTHER PUBLICATIONS

U.S. Appl. No. 13/324,237, filed Dec. 13, 2011, Kidd et al.
U.S. Appl. No. 61/897,764, filed Oct. 30, 2013, Vail.
Marchelli et al. "New Material Systems for 3D Ceramic Printing" Department of Mechanical Engineering, University of Washington, Sep. 15, 1999, pp. 477-487.
Noguera et al. "3D fine scale ceramic components formed by ink-jet prototyping process" (2005), pp. 1-14.
Yoo et al. "Structural Ceramic Components by 3D Printing" Department of Materials Science and Engineering and Mechanical Engineering, Massachusetts Institute of Technology (1993), pp. 40-50.

* cited by examiner

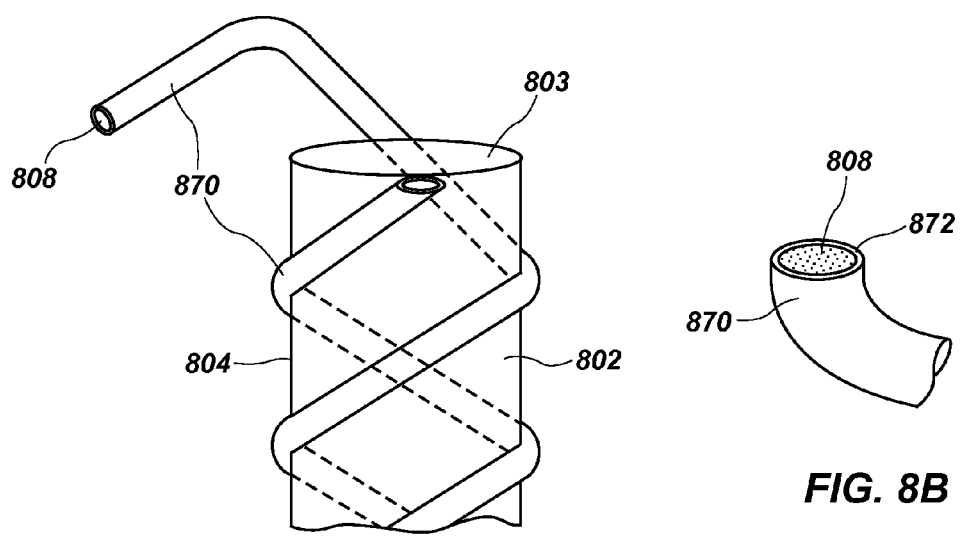
FIG. 8A
FIG. 8B
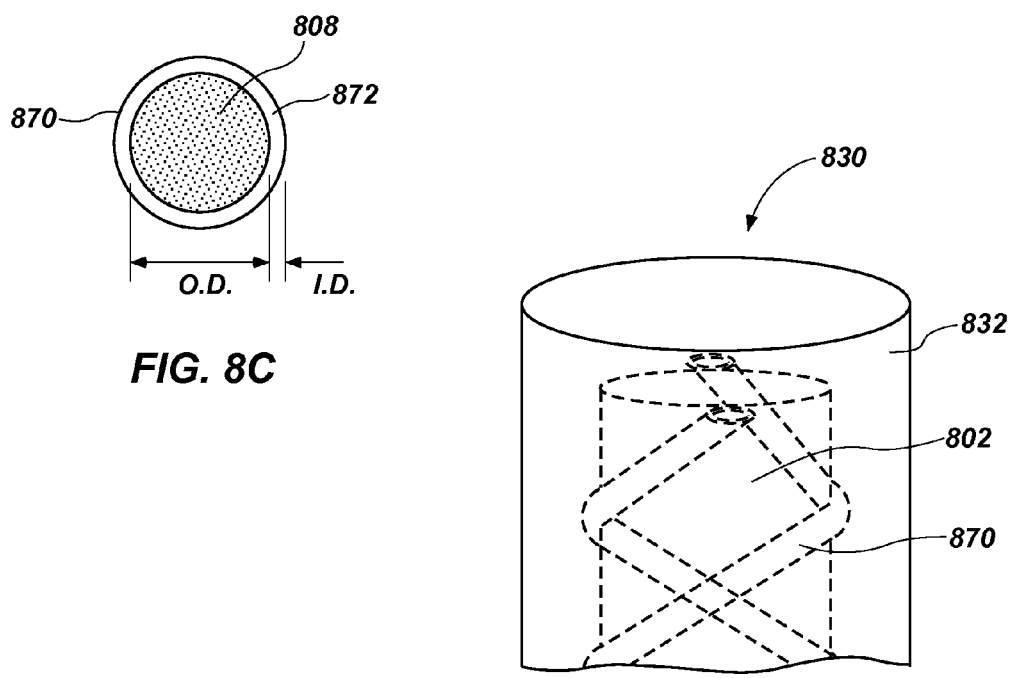
FIG. 8C
FIG. 8D

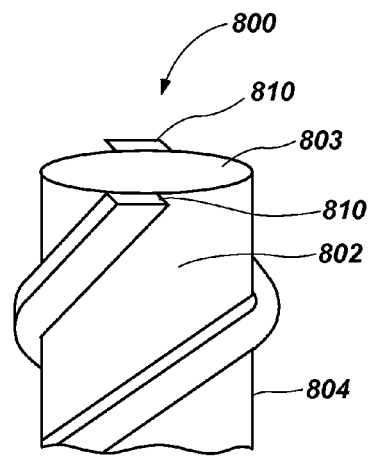
FIG. 8E
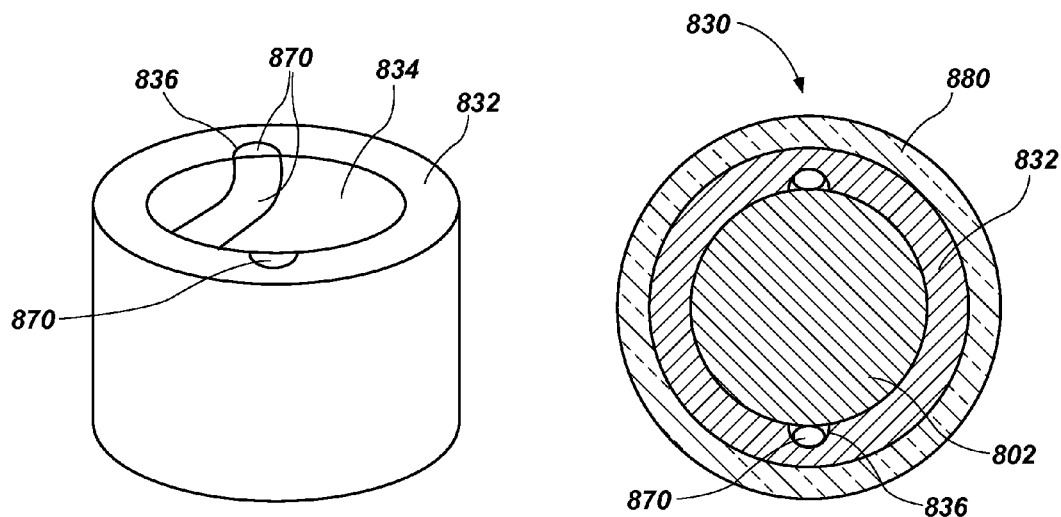
FIG. 8F
FIG. 8G

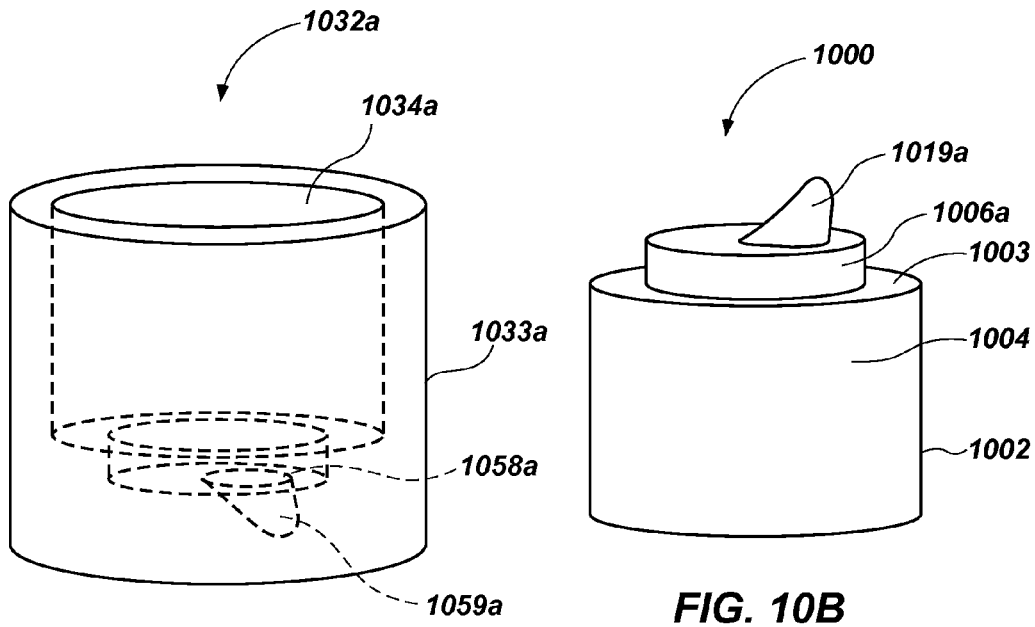
FIG. 10A
FIG. 10B
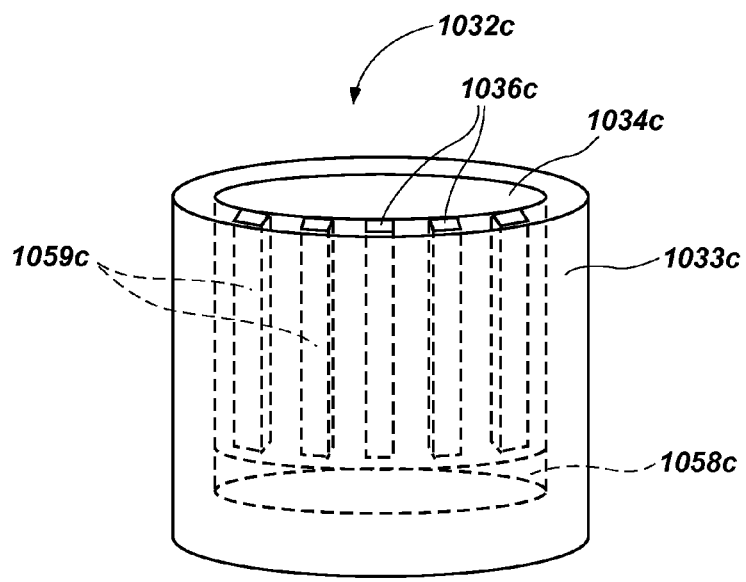
FIG. 10C

POSITIVE RELIEF FORMING OF POLYCRYSTALLINE DIAMOND STRUCTURES AND RESULTING CUTTING TOOLS

BACKGROUND

Wear resistant polycrystalline diamond ("PCD") materials are utilized in a variety of mechanical applications. For example, PCD materials are used in drilling tools (e.g., cutting elements, gage trimmers, etc.), machining equipment, bearing apparatuses, wire-drawing machinery, cutting tools (e.g., endmills, drills, etc.), and in other mechanical apparatuses.

PCD material has found particular utility in superabrasive cutting elements such as rotary drill bits, endmills, and drills. A polycrystalline diamond compact ("PDC") such as those used in rotary drill bits includes a PCD layer commonly known as the PCD body or table. The PCD body is formed and bonded to a substrate using a high-pressure/high-temperature ("HPHT") process.

Conventional PDCs are normally fabricated by placing a cemented carbide substrate into a container or cartridge with a volume of diamond particles positioned on an upper surface of the cemented carbide substrate. A number of such cartridges may be loaded into an HPHT press. The substrate(s) and volume of diamond particles are then processed under HPHT conditions in the presence of a catalyst material that causes the diamond particles to bond to one another to form a matrix of bonded diamond grains defining a PCD body or table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a metal-solvent catalyst to promote intergrowth between the diamond particles, which results in the formation of a matrix of bonded diamond grains having diamond-to-diamond bonding therebetween, with interstitial regions between the bonded diamond grains being occupied by the metal-solvent catalyst.

Traditional methods of making milling tools such as drills and endmills having a PCD portion thereon have typically included forming slots in substrate, forming a PCD body in the slot in a substrate and removing the substrate back to expose the PCD body. However, such methods can result in cracking and delamination of the PCD body due to mismatches in the coefficients of thermal expansion ("CTE") between the substrate material and the PCD body.

Despite the availability of a number of different types of PCD cutting tools, manufacturers and users of PCD cutting tools continue to seek improved PCD cutting tools.

SUMMARY

Embodiments of the invention relate to methods of making PCD structures having one or more PCD portions bonded to a substrate and PCD cutting tools made using the same. In an embodiment, a PCD structure may be made by forming a mold assembly including a mold having a cavity including at least one flute recess therein, a substrate positioned within the cavity, and a plurality of diamond particles positioned within the at least one flute recess. The method further includes subjecting the mold assembly to an HPHT process effective to sinter the diamond particles and bond at least one PCD portion at least partially formed from the diamond particles to an imperforate portion of the substrate (e.g., at an outer surface of the substrate).

In an embodiment, a method of making a PCD structure includes providing a substrate having a surface, and positioning at least one diamond material flute volume including diamond particles therein around a portion of the surface of the substrate. The method further includes subjecting the substrate having the at least one diamond material flute volume positioned therearound to HPHT conditions effective to sinter the diamond particles and bond at least one PCD portion at least partially formed from the diamond particles to the substrate (e.g., at an outer surface of the substrate).

In an embodiment, a method of making a PDC includes making a mold having a cavity including a PCD body recess and at least one standing feature recess extending from the PCD body recess. The method further includes positioning diamond particles in the PCD body recess, a substrate in the cavity, and diamond particles in the at least one standing feature recess. The method additionally includes enclosing the mold having the contents therein in a pressure transmitting medium. The method also includes subjecting the mold having the contents to HPHT conditions effective to sinter the diamond particles and bond PCD portions at least partially formed from the diamond particles to the substrate.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIG. 8A is an isometric view of a substrate having at least one diamond material tube wrapped around a surface thereof, according to an embodiment.

FIG. 8B is an isometric cutaway view of the at least one diamond material tube used to wrap around the substrate in FIG. 8A, according to an embodiment.

FIG. 8C is a top elevation view of the tube of FIG. 8B.

FIG. 8D is an isometric view of a mold assembly containing a substrate having at least one tube wrapped around a surface thereof, according to an embodiment.

FIG. 8E is an isometric view of a cutting tool formed using the mold assembly of FIG. 8D according to an embodiment.

FIG. 8F is a mold having tubes packed in the recesses therein and used for forming PCD structures according to an embodiment.

FIG. 8G is a top elevation view of a mold assembly using the mold of FIG. 8D or 8G.

FIG. 10A is an isometric view of a mold according to an embodiment.

FIG. 10B is an isometric view of a PDC made using the mold of FIG. 10A according to an embodiment.

FIG. 10C is an isometric view of a mold according to an embodiment.

DETAILED DESCRIPTION

Embodiments of the invention relate to PCD structures and methods of forming PCD structures by bonding one or more PCD portions to a substrate. In particular, the methods further include using molding techniques to facilitate bonding of the one or more PCD portions to the substrate.

Figure 1:
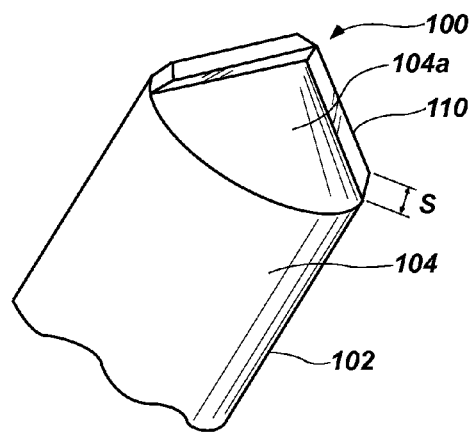
FIG. 1 is an isometric view of a cutting tool according to an embodiment.
Figure 2A:
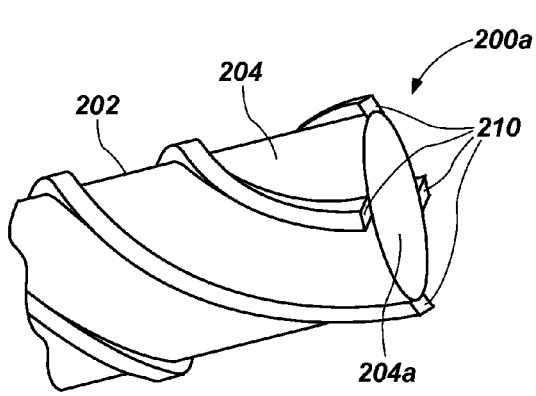
FIG. 2A is an isometric view of an endmill according to an embodiment.
Figure 2B:
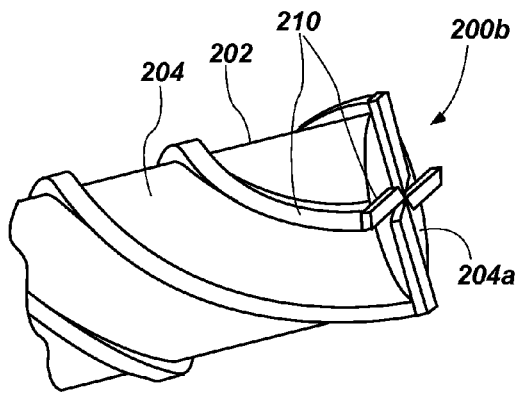
FIG. 2B is an isometric view of a face cutting endmill according to an embodiment.
Figure 2C:
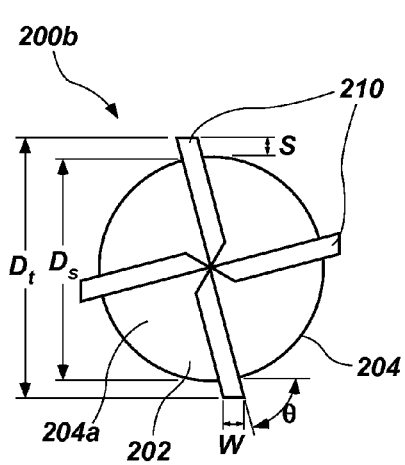
FIG. 2C is a top elevation view of the face cutting endmill depicted in FIG. 2B.
Figure 3:
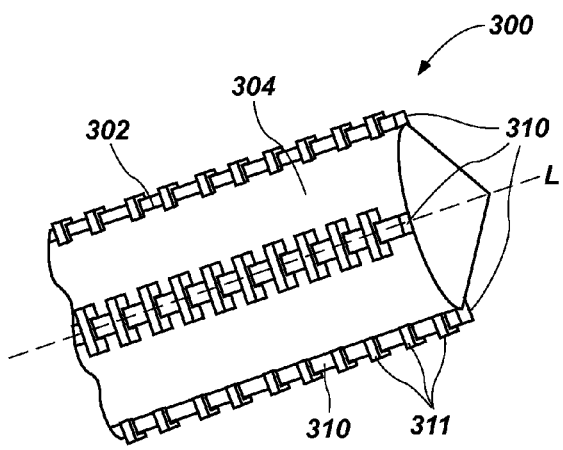
FIG. 3 is an isometric view of a tap according to an embodiment.

FIGS. 1-3 illustrate embodiments of cutting tools containing one or more PCD portions. The cutting tools may include a substrate having a surface, an end surface, and one or more PCD portions attached to the substrate. The substrate may comprise a carbide material, such as a cemented carbide material (e.g., cobalt-cemented tungsten-carbide). The substrate may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof, along with cementing constituents such as cobalt, nickel, iron or alloys thereof. For example, in an embodiment, the substrate 102 comprises cobalt-cemented tungsten carbide. In embodiments, a carbide substrate may include an infiltrant material such as copper, aluminum, or silicon.

The one or more PCD portions may include a plurality of polycrystalline diamond grains exhibiting diamond-to-diamond bonding therebetween (e.g., $sp^3$ bonding) and having interstitial spaces or regions therebetween. At least a portion of the plurality of interstitial regions, or in some embodiments, substantially of the interstitial spaces may be occupied by a metal-solvent catalyst, such as iron, nickel, cobalt, or mixtures or alloys of thereof. The one or more PCD portions may exhibit an average diamond grain size of about 50 µm or less, such as about 30 µm or less or about 20 µm or less. For example, the average grain size of the diamond grains may be about 1 µm to about 60 µm and, in some embodiments, about 5 µm to about 30 µm, about 10 µm to about 20 µm. In some embodiments, the average grain size of the diamond grains may be about 60 µm or less, such as about 2 µm to about 50 µm, about 10 µm to about 30 µm, about 2 µm to about 5 µm or submicron. The as-sintered diamond grain size may differ from the average particle size of the diamond particles prior to sintering due to a variety of different physical processes, such as grain growth, diamond particles fracturing, addition of carbon provided from another carbon source (e.g., dissolved carbon in the metal-solvent catalyst), or combinations of the foregoing.

Typically, PCD is formed when a plurality or mass of diamond particles (i.e., diamond powder) is subjected to HPHT conditions effective to sinter the diamond particles. The presence of a catalyst material aids in diamond-to-diamond bond formation between the diamond particles to form a matrix of bonded diamond grains exhibiting diamond-to-diamond bonding therebetween. An assembly including diamond particles, a substrate, and a catalyst material may be loaded into a refractory metal container (e.g., a refractory metal can) which may be loaded into a pressure transmitting medium (e.g., pyrophyllite), placed into an HPHT press, and subjected to HPHT conditions effective to sinter the diamond particles together to form PCD.

Diamond particles may be provided in the form of a diamond powder. A suitable diamond powder may comprise one or more modes (e.g., bimodal, or trimodal or greater) of average diamond particle sizes therein. By way of non-limiting example, a suitable bimodal diamond powder may include a first average diamond particle size of about 10 µm or greater (e.g., 10 µm to about 50 µm, about 15 µm to about 40 µm, about 20 µm to about 30 µm, about 15 µm, about 18 µm, about 20 µm, about 25 µm, or about 30 µm) and a second average diamond particle size of about 1 µm to about 20 µm (e.g., about 2 µm to about 15 µm, about 4 µm to about 10 µm, about 2 µm, about 5 µm, about 10 µm, or about 15 µm). Further, smaller average particle size distributions are contemplated herein. For example, a multimodal diamond powder may include any of the above average diamond particle size distributions in a mode and include a mode exhibiting an average diamond particle size distribution of less than about 1 µm, such as, about 1 nm to about 500 nm, about 10 nm to about 250 nm, about 20 nm to about 100 nm, about 5 nm, about 10 nm, about 20 nm, about 50 nm, about 100 nm, about 250 nm, or about 500 nm. In an embodiment, any one of the average diamond particle sizes recited herein may be used in combination with another average diamond particle size to create a multimodal diamond powder (e.g., where the average diamond particle sizes differ from each other).

In some embodiments, the HPHT sintering process may be carried out with diamond material (e.g., diamond powder) in the presence of a metal-solvent catalyst (e.g., iron, cobalt, nickel, or alloys of the foregoing), which may be provided in the form of one or more of a powder, a foil or disc, or from a substrate to which the one or more PCD portions are to be bonded, which at least partially melts and sweeps into the spaces between diamond particles at high temperatures to facilitate diamond-to-diamond bonding. Pressure transmitting mediums and/or structures may include by way of non-limiting example a refractory metal can, graphite structure, pyrophyllite, or any other materials known in the art. For example, suitable pressure transmitting mediums and/or structures are described in U.S. Pat. Nos. 6,338,754; 7,866,418; 8,074,566; and 8,323,367; each of which is incorporated herein, in its entirety, by this reference.

In embodiments, suitable pressures for the HPHT sintering process may include pressures of about 5 GPa or greater, such as, about 5 GPa to about 15 GPa, about 6 GPa to about 10 GPa, about 7 GPa to about 9 GPa, about 7 GPa and greater, about 5 GPa, about 6 GPa, about 7 GPa, or about 7.5 GPa. In embodiments, suitable temperatures for the HPHT sintering process may include temperatures at which diamond is stable. For example, diamond-stable temperatures used in an HPHT sintering process may include a temperature of at least about 1000° C., such as about 1100° C. to about 2200° C., about 1200° C. to about 1800° C., about 1300° C. to about 1600° C., about 1200° C., about 1300° C., about 1400° C., about 1500° C., about 1200° C. or greater, or about 1400° C. or greater.

Referring to FIG. 1, in an embodiment, a cutting tool 100 may be configured as a drill. The cutting tool 100 includes a substrate 102 (e.g., tool shaft or shank) having PCD portions 110 bonded to or otherwise attached to the substrate 102. As shown in FIG. 1, the PCD portions 110 may be bonded directly to an end surface 104a of the substrate 102 and extend a height or standoff distance S therefrom. In an embodiment (not shown), the PCD portions 110 may be bonded directly to the surface 104 (e.g., a peripheral or lateral surface) of the substrate 102 and extend a height or standoff distance S therefrom. Traditional spade drills employ a cutting insert positioned within a cavity formed on the end of a cylindrical substrate. The cutting tool 100 (i.e., drill) shown in FIG. 1 eliminates the need to form one or more cavities or recesses in a substrate by having the PCD portions 110 forming the cutting edge thereof bonded directly onto a surface of a substrate (e.g., at a conical end or end surface 104a of a drill). While the cutting tool 100 is depicted with two PCD portions 110 defining two cutting faces, one or more PCD portions defining one or more cutting faces may be used, such as by way of non-limiting example three PCD portions 110, or four PCD portions 110. The PCD portions 110 may align (e.g., extend generally parallel to) or otherwise associate with debris slots (not depicted) formed in the substrate 102 to facilitate material removal during drilling operations. As discussed in more detail below, in an embodiment, a substrate having debris slots helically formed therein may be aligned with the PCD portions 110 by a feature thereon to allow for formation of a cutting tool having debris slots aligned with the PCD portions 110.

Referring to FIG. 2A-2C, in embodiments, a cutting tool 200a or 200b may be configured as an endmill having PCD portions 210 bonded to a substrate 202 at a surface 204 and/or end surface 204a thereof. As shown in FIG. 2A-2C, the PCD portions 210 may extend generally helically around the surface 204 and optionally extend onto or otherwise be disposed on the end surface 204a thereof. The PCD portions 210 may extend away from the substrate 202 a width or standoff distance S. The PCD portions 210 extending generally helically around the substrate 202 define flutes or cutting faces of the cutting tool 200a or 200b. The cutting tool 200a or 200b may have one or more PCD portions 210 (e.g., flutes, and/or cutting faces) extending generally helically around the substrate 202, such as but not limited to two PCD portions 210, three PCD portions 210, or four PCD portions 210. In embodiments, such as shown in FIG. 2B, a generally helically extending (or radially extending) PCD portion 210 may also extend from the surface 204 to generally a center of the end surface 204a disposed at an end of the substrate 202. Traditional milling tools formed using PCD and a substrate require a channel or recess formed in substrate into which a diamond powder is inserted. The tools and methods for making tools described herein eliminate the need to insert diamond powders into a recessed substrate. In addition, such a configuration may impart a desirable compressive residual stress state to the one or more PCD portions 210.

FIG. 2C is a top view of the cutting tool 200b shown in FIG. 2B. The PCD portions 210 may extend across and be bonded directly to at least a portion of an end surface 204a. While the cutting tools 200a and 200b are shown having a flat end surface 204a, other shapes for end surfaces may be used, such as at least one of a domed end surface, a chamfered or filleted end surface, a stepped end surface, or any other suitable geometric configuration. The differing end surfaces may define a ball-nose tool, a radiused tool, a step tool, or another type of cutting tool.

Generally, embodiments disclosed herein may include threading taps or threading dies. Referring to FIG. 3, in an embodiment, a cutting tool 300 may be configured as a threading tap having PCD portions 310 including a plurality of thread cutting bodies 311 thereon, bonded to a substrate 302 (e.g., shaft or shank) at a surface 304 thereof. The PCD portions 310 may be aligned generally helically around or vertically with the substrate 302, and the plurality of thread cutting bodies 311 may be positioned, or formed on the PCD portions 310 such that the plurality of thread cutting bodies 311 is substantially perpendicular to a longitudinal axis L of the substrate 302 or oriented at another selected angle.

In an embodiment, the cutting elements 100, 200a or 200b, or 300 may have a substrate 102, 202, or 302 exhibiting any selected diameter or other lateral dimension, such as by way of non-limiting example, about 500 µm or more, about 1 mm to about 5 cm, about 5 mm to about 3 cm, about 1 cm to about 2 cm, or about 1/32 or more, about 1/16 of an inch to about 2 inches, about 1/8 of an inch to about 1 inch, about 1/4 of an inch to about 3/4 of an inch, about 1/2 inch, or about 1/3 of an inch.

In embodiments, the cutting tool 200b depicted in FIG. 2C, the substrate 102, 202, or 302 of the cutting element or PCD structure 100, 200a or b, or 300 may include a diameter Ds selected to exhibit a desired total diameter Dt of the cutting tool 100, 200a or b, or 300 when the PCD portions 110, 210, or 310 are bonded thereto. A standoff thickness S of the PCD portions 110, 210, or 310 may be selected to impart a selected dimensional characteristic (e.g., total diameter) to the cutting tool 100, 200a or b, or 300 when bonded to the substrate 102, 202, 302. In embodiments, the standoff distance S may be about 250 µm or more, such as, about 250 µm to about 3 cm, about 500 µm to about 2 cm, about 500 µm to about 1 cm, about 1 mm to about 50 mm, about 2 mm to about 10 mm, about 500 µm to about 5 mm, about 500 µm, about 1 mm, about 3 mm, about 10 mm, or about 1 cm. In embodiments, and as shown in FIG. 2C, the PCD portions 110, 210, or 310 may exhibit a width W, as measured laterally from one side of the PCD portion 110, 210, or 310 to the other side of the same PCD portion 110, 210, or 310 (e.g. as measured circumferentially about the surface). Suitable widths W may be selected based upon, among other considerations, desired debris clearance, bonding area between the PCD body and the substrate, shape of the PCD portion, total area of PCD material used, diameter of the substrate, total diameter of the tool, or combinations of the foregoing. Suitable widths W may be about 250 µm or more, about 250 µm to about 3 cm, about 500 µm to about 1 cm, about 1 mm to about 50 mm, about 2 mm to about 10 mm, about 500 µm to about 5 mm, about 500 µm, about 1 mm, about 3 mm, about 10 mm, or about 1 cm. In embodiments, the PCD portions 110, 210, or 310 may form a cutting face having an angle θ with respect to the surfaces 104, 204, 204a, or 304 at the point of attachment of the PCD portion. The angle θ may be about 90 degrees or less, such as about 90 degrees to about 30 degrees, about 80 degrees to about 45 degrees, about 75 degrees to about 60 degrees, about 90 degrees, about 75 degrees, about 60 degrees, or about 45 degrees.

As previously discussed, the substrate may include any material sufficient to bond with PCD material to form a PCD structure (e.g., a PDC). For example, the substrate 102, 202, or 302 may include a cemented carbide material made from any of the substrate materials described herein, such as cobalt-cemented tungsten carbide. The PCD portions 110, 210, or 310 may also be formed from any of the diamond particles (e.g., diamond powders) including any average particle size distributions and/or modes, and any catalyst or infiltrant materials described herein with respect to a PCD body.

Cutting tools having PCD portions (e.g., cutting faces, flutes, etc.) thereon are traditionally formed by forming recesses into a substrate, inserting diamond powder into the substrate, sintering the diamond powder to form PCD and bonding the PCD to the interior surface of the recess in the substrate, and then removing the substrate material to form flutes and/or expose the PCD material. The above method is time consuming, expensive, and can result in delamination of the PCD body in the recess unless large amounts of cobalt or another catalyst material are present within the PCD body which can result in decreased wear resistance and thermal stability of the PCD body. Further, a common problem of elongated substrates having a PCD body formed within a recess along the length thereof, is cracking in the PCD due to mismatch of thermal expansion between the PCD material and the substrate material to which it is bonded and/or cooling variation. In addition, the PCD material is compressed in the recess at high temperatures and high pressures and is then bonded to the recess upon cooling, which can result in cracking from the tensile stresses exerted from the recess in the substrate. The cutting tools formed by the methods described herein may reduce cracking and/or tensile stress states as compared to the tensile stress states exhibited by cutters made by cutting a recess into a substrate and then forming a PCD body therein. The geometry of the PCD portions and the substrates may be selected so that residual stresses in the PCD portions are sufficient to provide a damage tolerant PCD portions. The substrates describe herein may have a bonding surface to which the PCD portions are bonded that are un-recessed or imperforate, or put another way, may be formed without a recess for bonding PCD therein.

Referring to FIGS. 4A-4D, in embodiments, a PDC cutting tool (e.g., a PCD structure) may be configured with a PCD body positioned on top of a substrate. Such as PCD body may include a feature standing off of the PCD body and/or substrate. For example, such as a feature standing off of the substrate may be formed from a mold. The PCD body may be formed in a manner resulting in the PCD body having a geometry (e.g., lateral shape and/or size) different than that of the substrate. PCD bodies and substrates, as described with respect FIGS. 4A-4D may be formed using any of the PCD materials, substrate materials, and methods for forming PCDs or PDCs disclosed herein, including but not limited to diamond powder compositions, carbide compositions, sintering process conditions, and combinations of the foregoing. PCD bodies according to embodiments depicted in FIGS. 4A-4D may be formed using molds (e.g., cans, refractory cans, etc.) having a preformed negative shape of the finished PCD body therein rather than forming the PCD body and machining or otherwise processing the PCD body to a final finished shape and dimension. For example, the mold may include a cavity having a first portion including a shape complementary to the substrate (described generically as the cavity herein) and one or more second portions that may include a flute recess extending around a portion of or surface of the first portion. In embodiments, the cavity may include a third portion or more portions, without limitation. The second portion and/or third portion may comprise the flute recess, a PCD body cavity, or a standing feature cavity as described herein. While embodiments described below use specific terms for the cavity portions, portions of the cavities described below may be characterized as the first portion, the second portion, or the third portion.

Figure 4A:
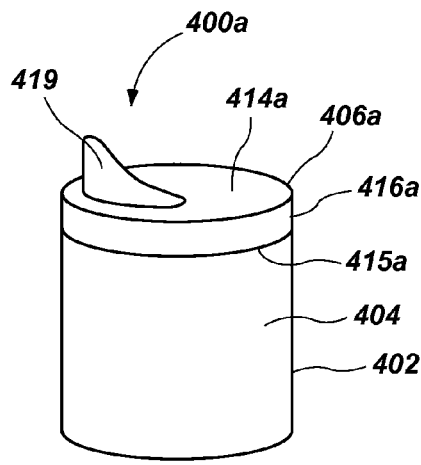
FIGS. 4A-4D are isometric views of PDCs according to embodiments.

Referring to FIG. 4A, in embodiments, a PDC 400a may include a substrate 402, a PCD body 406a including a working surface 414a, a bonding surface 415a bonded to the substrate 402, a lateral surface 416a, and a standing feature 419 bonded to and extending from the PCD body 406a to a height above the working surface 414a. The standing feature 419 may be used to scoop, plow, cut, or combinations thereof into rock or earthen materials being cut by the PDC 400a, or the standing feature 419 may stabilize the PDC 400a while it is traveling through rock or other earthen materials. The standing feature 419 may extend to a non-zero height above the working surface 414a of about 100 µm or more, such as about 250 µm to about 10 mm, about 500 µm to about 8 mm, about 1 mm to about 5 mm, about 2 mm to about 6 mm, about 2 mm to about 3 mm, or about 4 mm. As another example, the standing feature 419 may extend above the working surface 414a of the PCD body 406a to a height equal to about 1/20 the thickness of the PCD body 406a or more, about 1/10 the thickness of the PCD body 406a to about double the thickness of the PCD body 406a, about 1/5 the thickness of the PCD body 406a to about equal to the thickness of the PCD body 406a, about 1/4 the thickness of the PCD body 406a to about 3/4 the thickness of the PCD body 406a, about 1/3 the thickness of the PCD body 406a, about 1/2 the thickness of the PCD body 406a, or about 2/3 the thickness of the PCD body 406a. The standing feature 419 may exhibit a three-dimensional shape above the working surface 414a of any shape desired including, but not limited to, polygonal geometric shapes (e.g., cubic, rectangular cuboid, trapezoidal pyramid, triangular prisms, square pyramids, triangular pyramids) cones, cylinders, amorphous shapes, rounded versions of the foregoing, shapes comprising combinations of the foregoing, and blended versions of combinations of the foregoing. The standing feature 419 may be located at or centered about any position on the working surface 414a of the PCD body 406a, such as but not limited to, a center of the working surface 414a, a position off of the center of the working surface 414a, a position at the outer periphery of the working surface 414a (i.e., nearest the lateral surface 416a), or combinations thereof.

The standing feature 419 may occupy a selected proportion of the working surface 414a of the PCD body 406a. For example, the standing feature 419 may cover about 5 percent or more of the working surface 414a of the PCD body 406a, such as about 5 percent to about 95 percent, about 10 percent to about 80 percent, about 20 percent to about 75 percent, about 30 percent to about 50 percent, about 20 percent, about 30 percent, or about 40 percent of the working surface 414a of the PCD body 406a.

As shown in the illustrated embodiment shown in FIG. 4A, the standing feature 419 may exhibit a substantially rounded pyramid shape which may have a fin or scoop-like appearance. The standing feature 419 may extend above the working surface 414a to a height about equal to the thickness of the PCD body 406a and be positioned at a distance between a center of the working surface of the PCD body 406a and an outer periphery of the PCD body (i.e., near the lateral surface of the PCD body 406a). As explained in more detail below, the PCD body 406a having the standing feature 419 thereon may be formed as a unitary piece (i.e., formed from a single diamond powder volume or formed using different layers or regions of diamond powders in the same HPHT process) using a mold.

Figure 4B:
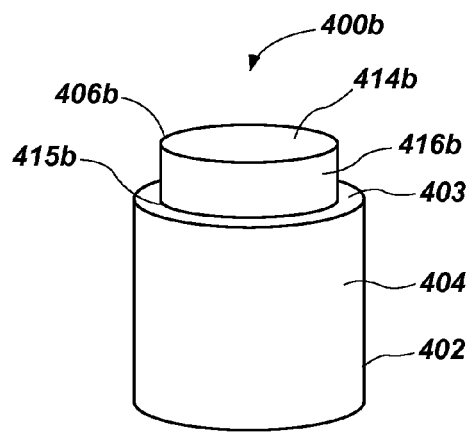

Referring to FIG. 4B, a PDC 400b may include a PCD body 406b exhibiting a smaller lateral dimension than that of the substrate 402 it is bonded to. For example, the PCD body 406b may include a working surface 414b, a bonding surface 415b, and a lateral surface 416b therebetween. For example, the bonding surface 415b may occupy less than 100 percent of an interfacial surface 403 of the substrate 402 to which the PCD body 406b is bonded, such as about 99 percent to about 10 percent, about 90 percent to about 20 percent, about 80 percent to about 30 percent, about 70 percent to about 40 percent, about 50 percent, about 60 percent, or about 75 percent. In the illustrated embodiment, the lateral surface 416b has an angle of about 90 degrees with respect to the interfacial surface 403. The angle of the lateral surface 416b may be increased or decreased to control the area of the working surface 414b and/or the area of the bonding surface 415b. For example, the lateral surface 416b may form an angle relative to the interfacial surface above about 30 degrees, such as about 45 degrees to about 135 degrees, about 60 degrees to about 120 degrees, about 75 degrees to about 105 degrees, about 45 degrees, about 60 degrees, about 75 degrees, about 95 degrees, or about 105 degrees.

Figure 4C:
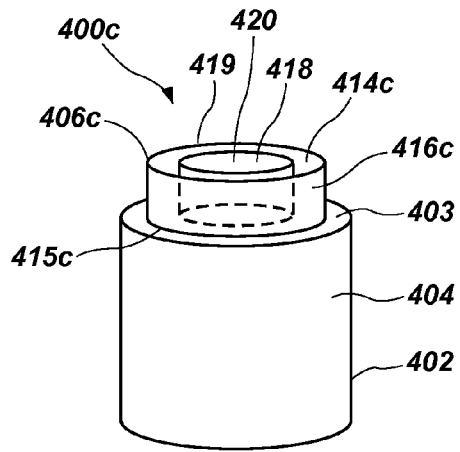
Figure 4D:
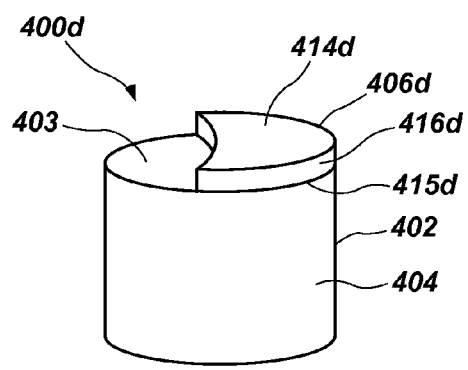

Referring to FIGS. 4C and 4D, a PDC 400c or 400d may include a PCD body 406c or 406d exhibiting a different lateral shape and/or size than that of the substrate 402 it is bonded to. The PCD body 406c or 406d may include a working surface 414c or 414d, a bonding surface 415c or 415d, and a lateral surface 416c or 416d therebetween. In embodiments, the PCD body 406c may exhibit a substantially annular geometry including a cavity 420 (e.g., cut-out) therein. In such an embodiment, the PCD body 406c may include an interior surface 418 defining the cavity 420. In such embodiments, the substrate 402c may include a raised portion extending a height above the interfacial surface 403 into the cavity 420; the raised portion may extend a height such as to the working surface 414c or less, such as about half way to the working surface 414c. In an embodiment (not depicted), the substrate 402 may include a through hole therein, with the through hole substantially matching and aligned with the lateral dimensions of the cavity 420, or being otherwise within the lateral dimensions of the cavity 420 at the interfacial surface 403, to allow for coolant and debris flow therethrough.

The lateral dimensions of the PCD body 406c may be selected based on the area of interfacial surface 403c to bonding surface 415c or area of working surface substantially as described above. For example, the angle of the lateral surface 416c and the interior surface 418 may be selected substantially as described above. The areas and angles may be substantially similar to those described with respect to FIG. 4B.

In embodiments, the PCD body may have a different lateral shape compared to the substrate and may be positioned anywhere on the interfacial surface of the substrate. For example, the PCD body may only be located over only a portion of the substrate, such as substantially only over one half of the substrate, to thereby leave the portion of the interfacial surface exposed. As shown in FIG. 4D, in an embodiment, a PDC 400d including a PCD body 406d may have a lateral shape different that the substrate 402 including, but not limited to, polygonal shapes (e.g., triangular, rectangular, etc.), oblong shapes, rounded shapes, semi-circular shapes, ovals, half circles, crescents, or combinations of the foregoing. For example, the PCD body 406d having a crescent shape disposed along at least a portion of the substrate interfacial surface 403. The PCD body 406d may have a working surface 414d, a bonding surface 415d bonded to the substrate interfacial surface 403, and a lateral surface 416d extending therebetween.

Elements of any and all of the foregoing PDCs 400a-400d may be combined to form a PCD body either directly or indirectly bonded to a substrate. For example, an annular- or crescent-shaped PCD body being less than the full lateral dimension of an interfacial surface of a substrate may include a standing feature extending from a working surface thereof, the PCD body being positioned off of the center of the interfacial surface. In some embodiments, the PCD bodies shown in FIGS. 4A-4D may extend laterally past the substrate to which it is bonded, such as a diameter or other lateral dimension of the PCD body may be greater than a diameter or other lateral dimension of the substrate.

Referring to FIGS. 5A-5D, a PDC may include, in addition to a PCD body, at least one additional PCD portion bonded to a substrate. Put another way, a plurality of PCD portions may be bonded to a substrate. For example, in embodiments, the additional PCD portions may be bonded to an interfacial surface of the substrate, or to any surface of the substrate. Such additional PCD portions may be configured as fins, wear surfaces, or rails, which may impart improved wear resistance, reduce heat checking, improve stability during cutting operations of the PDC, or combinations thereof. The PCD portions may extend away from the substrate to a selected distance about 100 µm or more, about 100 µm to about 2 cm, about 500 µm to about 1 cm, about 1 mm to about 8 mm, about 500 µm, about 2 mm, about 5 mm, or about 10 mm. The PCD portions may extend away from the substrate in any number of orientations including, but not limited to, substantially parallel to a length of the substrate, substantially perpendicular to the length of the substrate, or combinations of the forgoing. The shapes of the PCD portions described above may be similar to those described herein for any other PCD portion.

Figure 5A:
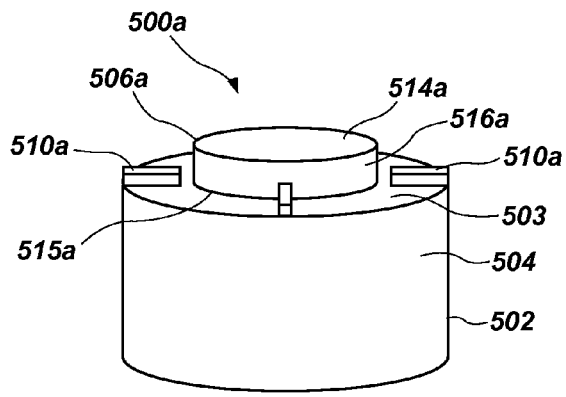
FIGS. 5A-5C are isometric views of PDCs having additional PCD portions thereon according to embodiments.

As shown in FIG. 5A, a PDC 500a may include a PCD body 506a having a working surface 514a, a bonding surface 515a, and a lateral surface 516a therebetween. The PDC 500*a* may further include a substrate 502 having an interfacial surface 503 bonded to the bonding surface 515*a* of the PCD body 506*a*, and the substrate 502 may include one or more PCD portions 510*a* thereon. The PCD portions 510*a* may be bonded to the substrate 502 at the interfacial surface 503 thereof. The PCD portions 510*a* may be circumferentially spaced from each other on the interfacial surface 503, which may include any type of spacing therebetween (e.g., equidistant spacing, clustered, or random). The PCD portions 510*a* may be distributed about only a portion (e.g., one side) of the interfacial surface 503 of the substrate 502 or may be concentrated more in one region of the substrate 502. The PCD portions 510*a* may prevent or limit wear of the interfacial surface 503 of the substrate 502 during use. The PCD portions 510*a* bonded to the interfacial surface 503 may have any orientation including direction and spatial orientations. For example, the PCD portions 510*a* may be separate from or touch the PCD body 506*a*. The PCD portions 510*a* may extend from an interior location to the surface 504 of the substrate 502 or remain inside the boundary of the interfacial surface 503 only.

Figure 5B:
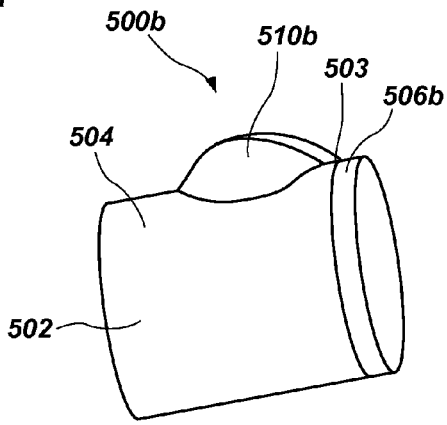

As shown in FIG. 5B, a PCD 500*b* may include a PCD body 506*b* bonded to an interfacial surface 503 of the substrate 502, and a PCD portion 510*b* bonded to the substrate 502 at a surface 504 thereof. The PCD portion 510*b* may be positioned at any point on the surface 504 of the substrate 502. For example, the PCD portion 510*b* may abut the PCD body 506*b* near the interfacial surface 503 of the substrate 502, or the PCD portion 510*b* may be spaced from the PCD body 506*b*. The PCD portion 510*b* may run longitudinally substantially parallel to a length the substrate 502, such as depicted, or may extend in any other direction such as longitudinally substantially perpendicular to a length of the substrate 502. The PCD portion 510*b* is depicted as a semi-circular rail or fin extending away from the surface 504 of the substrate 502. However, the shape of the PCD portion 510*b* may be any shape disclosed herein for PCD portions, such as substantially flat (e.g., a three dimensional polygonal). The PCD portion 510*b* may run any length, portion, or distance along the substrate 502 such as by way of non-limiting example, a portion of or the entire longitudinal dimension of the surface 504 of substrate 502, a portion or the entire circumferential dimension of the surface 504 of the substrate 502, or a discrete point or region on the surface 504 of the substrate 502.

Figure 5C:
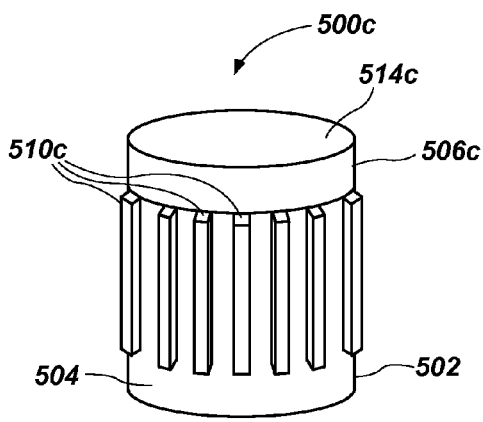
Figure 5D:
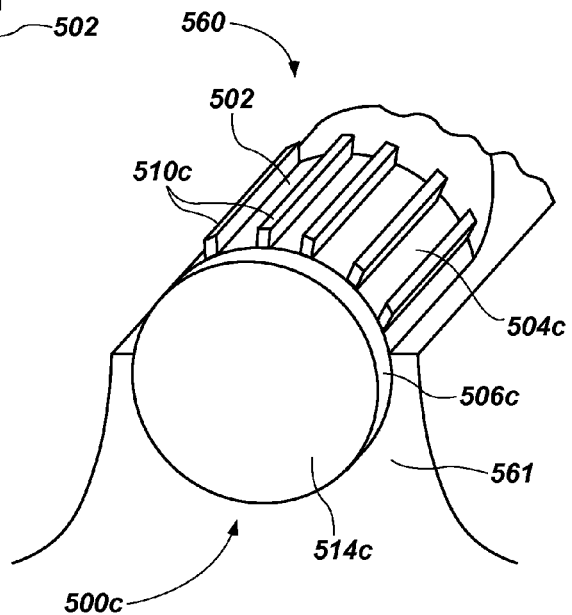
FIG. 5D is a partial isometric view of a bit body having the PDC shown in FIG. 5C attached thereto according to an embodiment.

In some embodiments, a plurality of PCD portions may be bonded to a substrate. For example, as shown in FIG. 5C, a plurality of PCD portions 510*c* may be bonded to the surface 504 of the substrate 502. The PCD portions 510*c* may be circumferentially spaced from each other on the surface 504 of the substrate 502, or may be distributed in any other manner on the surface 504 of the substrate 502 (e.g., randomly, longitudinally, laterally, or combinations of the foregoing). As shown, the PCD portions 510*c* may be oriented to run in a longitudinally substantially parallel manner to a length of the substrate 502, or may be oriented to run in substantially perpendicular to the length of the substrate 502. The PCD portions 510*c* may be spaced from each other on the surface 504 in any manner, such as equidistant from one another, randomly, concentrated in one region of a surface more than others, only on a particular region of the substrate, or combinations of the foregoing. For example in FIGS. 5C and 5D, the PCD portions 510*c* are only located on one half of the side surface 504 of the substrate 502 to facilitate positioning of the PDC 500*c* into a bit body 561 of a rotary drill bit 560. The PCD portions 510*c* may provide wear resistance features that protect and/or reduce heat checking of the substrate 502 and/or provide stability through a rock or earthen material during cutting operations.

The PCD bodies, substrates and PCD portions extending from a surface thereon disclosed herein may be made using molds and molding techniques as described below. Referring to FIGS. 6A-6E, an endmill may be made using a mold 632 having a mold cavity 634 including at least one flute recess 636 therein. The mold 632 may include an outer surface 633 and an upper surface 635. The mold cavity 634 may be an elongated generally cylindrical cut out, a wide generally cylindrical cut out, or any other shape suitable to insert a substrate (e.g., shaft or shank) therein. The flute recesses 636 may be disposed in the mold cavity 634 in any manner such as, but not limited to, generally helically extending about an inner periphery of the mold cavity 634, longitudinally substantially parallel to a length of the mold cavity, substantially perpendicular to a length of the mold cavity 634, or combinations of the foregoing. The mold cavity 634 may exhibit a diameter Ds or other lateral dimension selected to allow the substrate having a diameter Ds to be inserted into the mold cavity 634 such that the substrate surface is in contact with the mold cavity inner surface when positioned therein. The flute recesses 636 may exhibit a negative geometry sufficient to produce a tool having a width W substantially similar to any width W described above, and a standoff distance S substantially similar to any described above. The mold cavity diameter Ds and the sum of the standoff distances S may equal the total diameter Dt, such as any of those described above, results in a cutting tool formed therein exhibiting the substantially the same dimensions. The mold cavity lengths, as used in any embodiment herein, may be about 2 cm to about 50 cm, such as about 3 cm to about 40 cm, about 4 cm to about 30 cm, about 2 cm to about 20 cm, about 3 cm to about 15 cm, about 4 cm to about 12 cm, about 6 cm, or about 7 cm. Molds, as used in any embodiment herein, may be correspondingly wider and longer than the mold cavities including flute recesses disclosed such as, for example, wider and/or longer than the mold cavities and recesses by about 5% or more, such as about 10% to about 30%, about 15%, or by about 2 mm or more, such as about 2 mm to about 3 cm, about 5 mm to about 20 cm, or about 1 cm larger than the maximum extent of any mold cavity including any flute recess therein.

Figure 6A:
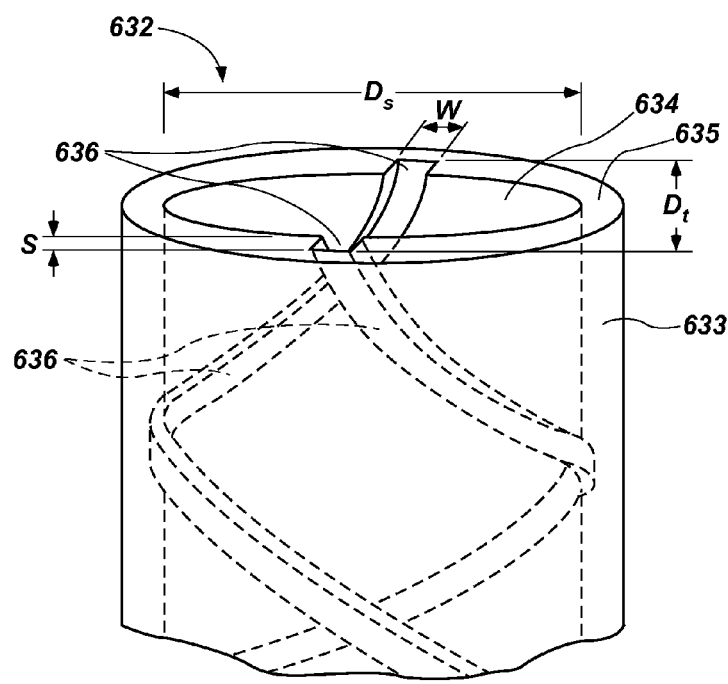
FIG. 6A is an isometric view of a mold according to an embodiment.
Figure 6B:
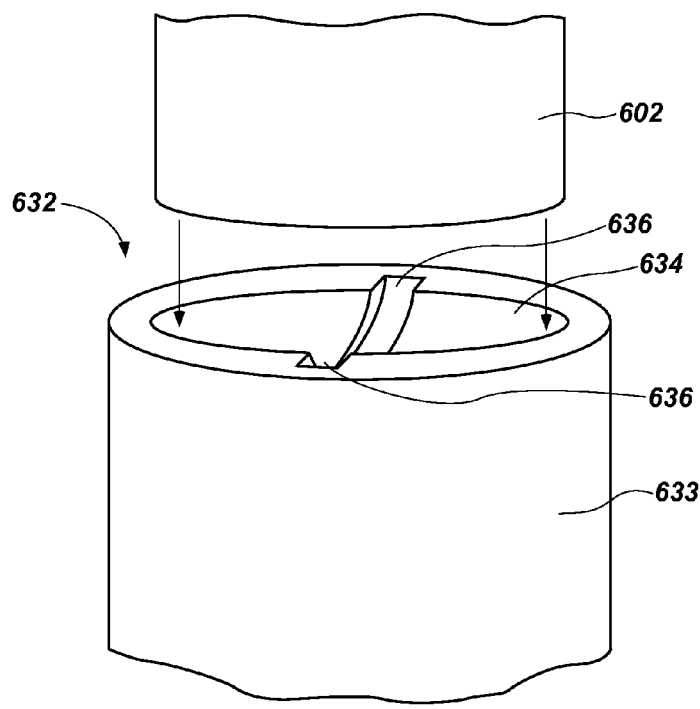
FIG. 6B is an isometric view of a substrate being inserted into the mold of FIG. 6A.
Figure 6C:
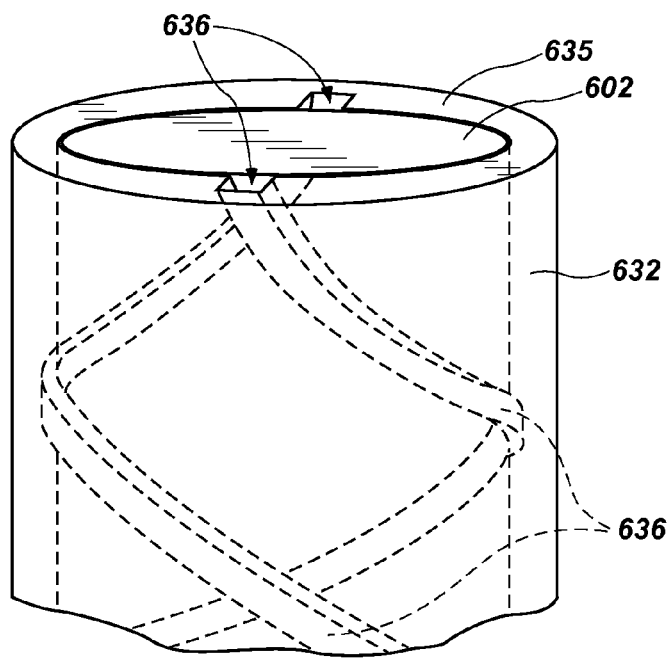
FIG. 6C is an isometric view of a substrate disposed in the mold of FIG. 6A.
Figure 6D:
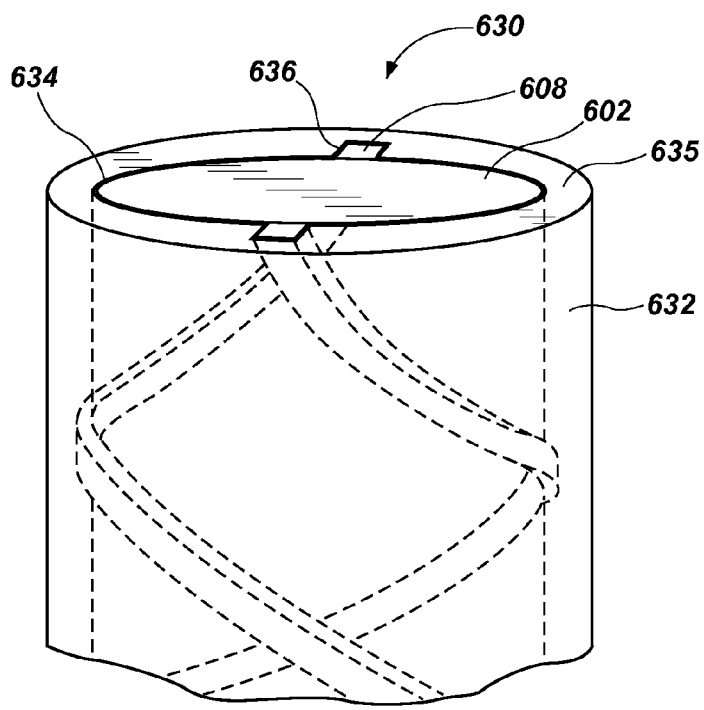
FIG. 6D is an isometric view of a mold assembly including the substrate and diamond particles disposed in the mold of FIG. 6A.

As shown in FIG. 6B-6D, a substrate 602 may be inserted into the mold cavity 634 such that surface of the substrate 602 is in contact with the inner surface of the mold cavity 634, while the flute recesses 636 may be substantially empty or may be filled with a material (e.g., diamond powder). The substrate 602 may include any composition or configuration described herein for a substrate. Diamond material 608 may fill the flute recesses 636. By way of non-limiting example, diamond materials 608 may include loose or free diamond particles or powder, shear-compacted tape having diamond particles therein, diamond powder held by a binder (e.g., by a wax or polymer), agglomerates of diamond particles or powder, any other suitable diamond material, or combinations of one or more of any of the foregoing. Suitable diamond materials include any of those described in U.S. Pat. Nos. 7,806,206 and 8,316,969, each of which is incorporated herein, in its entirety, by this reference. Suitable diamond powders may include any of those disclosed herein, including but not limited to, average diamond particle size, number of modes, catalyst content and amount, or combinations of the foregoing. The diamond material 608 may be positioned in the flute recess 636 by pouring the diamond material 608 into each individual flute recess 636 once the substrate 602 has been positioned within the mold cavity 634. To ensure that the diamond material 608 occupies each flute recess 636 substantially completely (e.g., the entire volume of the flute recesses 636 are filled with the diamond material 608), the diamond material 608 in the mold assembly 630 (i.e., mold, substrate therein, and diamond powder positioned in the flute recesses) may be compacted. In order to compact or otherwise consolidate the diamond material 608 in the mold 632, the mold 632 may be subjected to agitation including but not limited to, tumbling, a shaker table, ultrasonic agitation, or combinations thereof.

Referring to FIG. 6D, after forming the mold assembly 630, the mold assembly 630 may be placed into a refractory metal container (e.g., can) which is then loaded into a suitable pressure transmitting medium such as, by way of non-limiting example, pyrophyllite. The pressure transmitting medium containing the mold assembly 630 may then be subjected to an HPHT process, including HPHT conditions substantially similar to any described herein, effective to sinter the diamond particles in the diamond material 608 and bond the resulting PCD portions to a surface of the substrate 602. During the HPHT process, a catalyst material (e.g., cobalt), mixed with the diamond material (e.g., diamond powder) and/or present in the substrate 602 may melt and sweep into the interstitial spaces between diamond particles and, upon cooling; the catalyst material may form a mechanical and/or chemical bond between the PCD portion and the substrate 602.

Figure 6E:
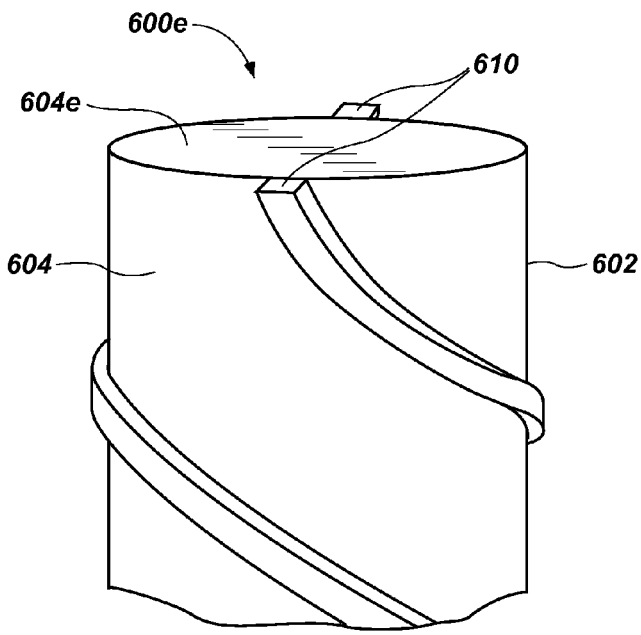
FIG. 6E is an isometric view of a cutting tool formed using the mold assembly of FIG. 6D according to an embodiment.

As shown in FIG. 6E, a cutting tool 600e may be removed from the mold 632 after HPHT processing. The cutting tool 600e may be removed from the mold 632 by any technique sufficient to remove mold material from a part or vice versa, such as, pressure/media blasting, dissolution, breaking away pieces of the mold, uncoupling the mold, or combinations of the foregoing. The resulting cutting tool 600e may be configured as an endmill having the substrate 602 including the surface 604 having the PCD portions 610 bonded thereto an imperforate portion of the surface 604. That is, the PCD portions 610 are bonded to a portion the surface 604 that does not include recesses formed therein. Optionally, a face cutting endmill (not depicted) may be formed by including PCD portions on an end surface 604e (e.g., facial surface) of the substrate 602.

Suitable molds for any of the embodiments herein may be formed using a number of techniques including, but not limited to, obtaining or creating a part having positive dimensions (such as by wax printing or rapid prototyping machines), investment casting or pressing (e.g., isostatically pressing or molding) a mold of the part, removing the part from the mold (e.g., by twisting the part out, or by cutting the mold into recombinable portions), and saving the mold having a negative impression of the part therein to be used in the processes described herein. Such molds may include casting a rubber mold or multi-piece mold. In some embodiments, a mold may be made by casting a solid mold blank using a machinable and/or pressable medium such as, but not limited to, hexagonal boron nitride ("HBN"), alumina, Talc, graphite, salt, a ceramic material, other powders amenable to being pressed, or combinations of the foregoing; and/or cutting/machining a mold cavity (e.g., hole) therethrough to accommodate a substrate, and then cutting flute recesses into the mold cavity in any desired configuration. The machining may be performed using milling techniques (e.g., conventional milling (e.g., vertical or horizontal milling), thread cutting, extrusion, etc.), lasing, electro-discharge machining ("EDM"), or combinations of the foregoing. In some embodiments, as described in more detail below, a mold may be formed by directly three-dimensional ("3-D") printing a refractory metal can in the shape of a mold defining a mold cavity including flute recesses therein. In an embodiment, the interior surface of the mold cavity may be coated with a material that will not fowl or contaminate formation of the PCD and/or PCD to substrate bonding process. Suitable coatings may include HBN or a refractory metal, and may be in the form of a film, paint, foil, powder, or combinations of the foregoing. Suitable materials for molds being cast or machined include any of those materials stated above.

Figure 6F:
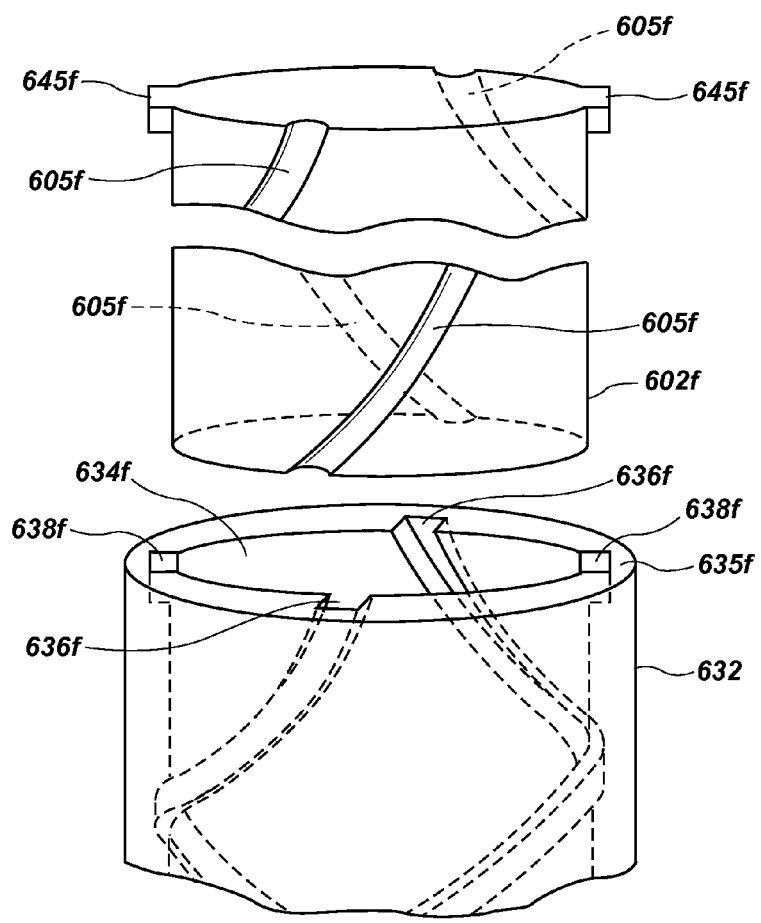
FIG. 6F is an isometric view of a substrate being inserted into the mold according to an embodiment.
Figure 6G:
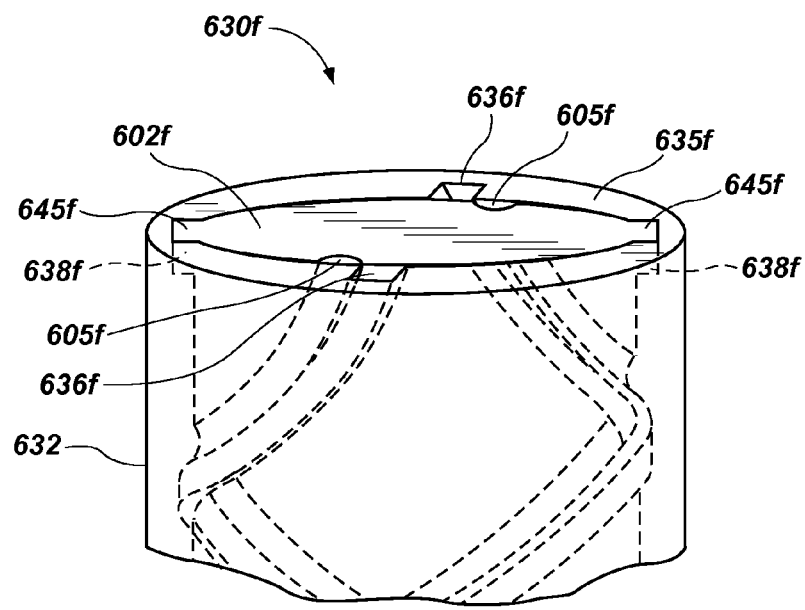
FIG. 6G is an isometric view of the substrate disposed in the mold of FIG. 6F.

In some embodiments, such as that shown in FIGS. 6F-6G, a mold 632f may include one or more alignment recesses 638f formed therein. The alignment recesses 638f may be positioned on the interior surface of a mold cavity 634f and extend inwardly from the upper mold surface 635f a distance therein. The alignment recess 638f may be positioned such that debris slots 605f formed in a corresponding substrate 602f inserted into the mold cavity 634f may substantially align with (e.g., extend substantially congruent with) the at least one flute recess 636f formed in the mold cavity 634f. Such a configuration may facilitate that a resulting PCD portion formed therein may push cut debris through the debris slot 605f aligned therewith (e.g., in front of a cutting face formed from the PCD portion), and/or may facilitate that, during formation of the cutting tool, substantially no diamond powder poured or positioned in the at least one flute recess 636f falls into the debris slots 605f on the substrate 602f.

As shown in FIG. 6G, when the alignment protrusions 645f of the substrate 602f are inserted or otherwise aligned with the alignment recesses 638f in the mold 632f, the flute recesses 636f are adjacent to, without overlapping, the debris slots 605f defined by the substrate 602f. The act of assembling a mold assembly may include aligning any alignment recesses and protrusions therein. After aligning the substrate 602f with the mold 632f using the alignment protrusions 645f and alignment recesses 638f, diamond material such as any described herein may be poured or otherwise inserted into the flute recesses 636f therein to form the mold assembly 630f. In another embodiment, the diamond material may be positioned within flute recesses 636f and then the substrate 602f may be positioned within the mold 632f.

The mold assembly 630f may be loaded into a refractory metal container, which may be further loaded into a pressure transmitting medium. The pressure transmitting medium including all of the above contents may be loaded into an HPHT press in which the pressure transmitting medium and the contents thereof are subjected to HPHT conditions substantial similar to any described herein. After cooling, the mold 632 may be removed, leaving only the cutting tool 600f including the substrate 602f having the debris slots 605f therein, the PCD portions 610f adjacent to the debris slots 605f bonded to the surface of the substrate 602f, and the alignment protrusions 645f extending laterally from the end surface of the substrate 602f.

The cutting tool 600f may be further finished after removal from the mold such as, by way of non-limiting example, removing the alignment protrusions 645f using machining (e.g., EDM), lasing, grinding, or breaking; or lapping the end surface of the substrate 602f or the PCD portions 610f bonded to the surface of the substrate 602f. In embodiments, finishing may include final adjustments to the surface finish of a portion of the cutting tool 600f, removing some PCD material to smooth a rough surface or provide a desired dimension, removing some PCD material to form thread cutting bodies, removing portions of the substrate to form debris slots, or combinations of the foregoing.

Figure 6H:
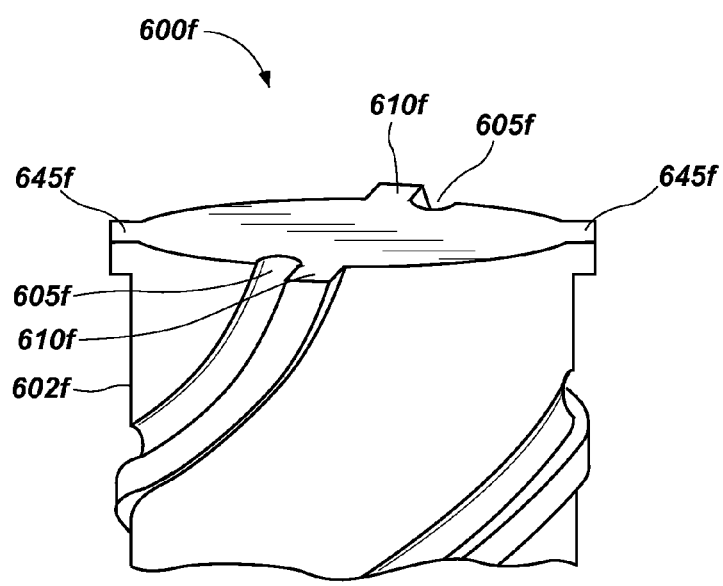
FIG. 6H is an isometric view of a cutting tool formed using the mold assembly of FIG. 6G.

In some embodiments, more generally, debris slots in the substrate may have many configurations. For example, debris slots may extend substantially congruent to the PCD portions on the substrate, or may extend non-parallel thereto. The debris slots may exhibit a cross-sectional geometry such as, but not limited to, generally rectangular, rounded (e.g., semi-circular as shown in FIG. 6H), or triangular. The debris slots may extend a depth into the substrate from the surface thereof such as, by way of non-limiting example, about 100 μm or more, about 500 μm to about 2 cm, about 1 mm to about 1 cm, about 2 mm to about 8 mm, about 1 mm, or about 2 mm. Debris slot may extend a width, around a circumference of the substrate, of about 100 μm or more, about 500 μm to about 3 cm, 1 μm to about 2 cm, about 1 mm to about 1 cm, about 2 mm to about 8 mm, about 2 mm, or about 4 mm. Debris slots may be adjacent (e.g., extend substantially congruent with) to PCD portions with or without overlapping, or may be spaced a distance therefrom. Any number of debris slots may be used on a cutting tool. The number of debris slots and PCD portions may be the same as or may be different from each other. For example, by way of non-limiting example, cutting tools may have one or more PCD portion (e.g., two or three) thereon and one or more debris slots (e.g., two or three) therein (such as depicted in FIG. 6H). In an embodiment, a cutting tool may have four PCD portions thereon and two debris slots therein. Molds may be correspondingly manufactured to produce any of the cutting tools described herein, or individual features described therewith.

In some embodiments, one or more alignment protrusions and recesses may be used such as one, two (as shown in FIGS. 6F-6H), three, or four or more. The alignment protrusions and corresponding alignment recesses may have many different sizes and configurations. For example, the alignment protrusions and recesses may be configured as polygonal, rounded, or other suitable shapes extending into the interior surface of a mold cavity. The alignment protrusions and recesses may extend a distance into the interior surface of about 500 μm or more, such as about 500 μm to about 2 cm, about 1 mm to about 1 cm, about 2 mm to about 8 mm, about 3 mm, about 5 mm, or about 6 mm. In some embodiments, the alignment protrusions and alignment slots may exhibit a width from one side to another of about 500 μm or more, such as about 500 μm to about 2 cm, about 1 mm to about 1 cm, about 2 mm to about 8 mm, about 3 mm, about 5 mm, or about 6 mm. Additionally, standoff distances S, number of PCD portions, number of debris slots, width of PCD portions, number and/or configuration of alignment protrusions and recesses, combinations thereof or any other characteristic of a cutting tool or mold form making same may be adjusted based on the desired size of the substrate and/or finished tool. By way of non-limiting example, a cutting tool having a comparatively larger diameter substrate may use larger PCD portions including a larger standoff distance S and/or larger width W, more PCD portions, or more debris slots therein.

Figure 7A:
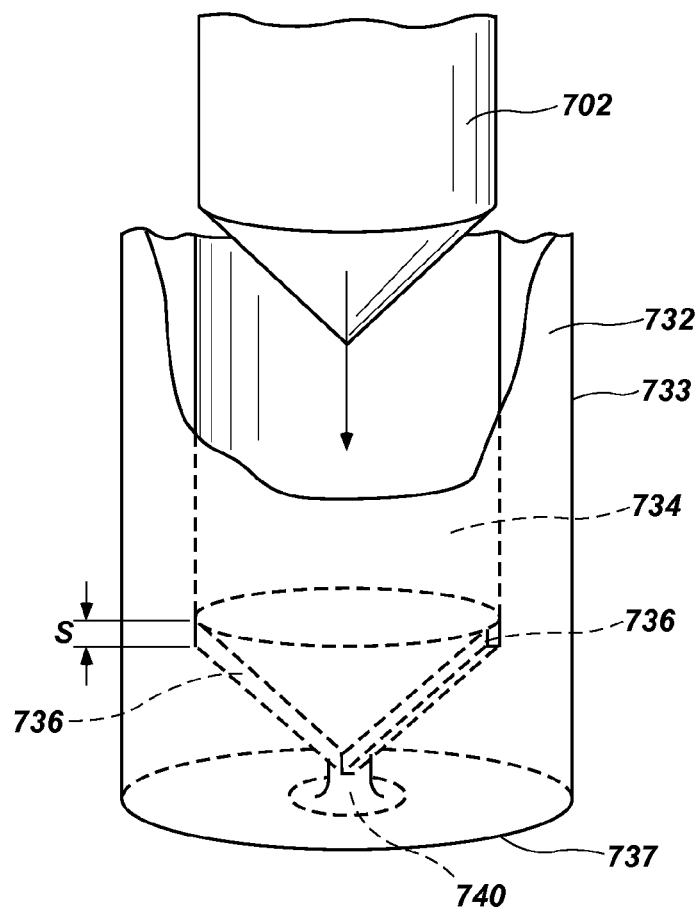
FIG. 7A is an isometric cutaway view of a mold having a substrate inserted therein according to an embodiment.
Figure 7B:
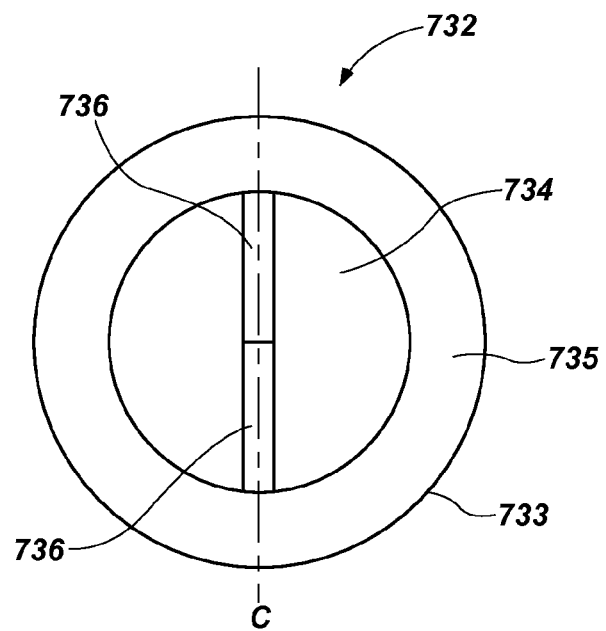
FIG. 7B is a top elevation view of the mold of FIG. 7A.
Figure 7C:
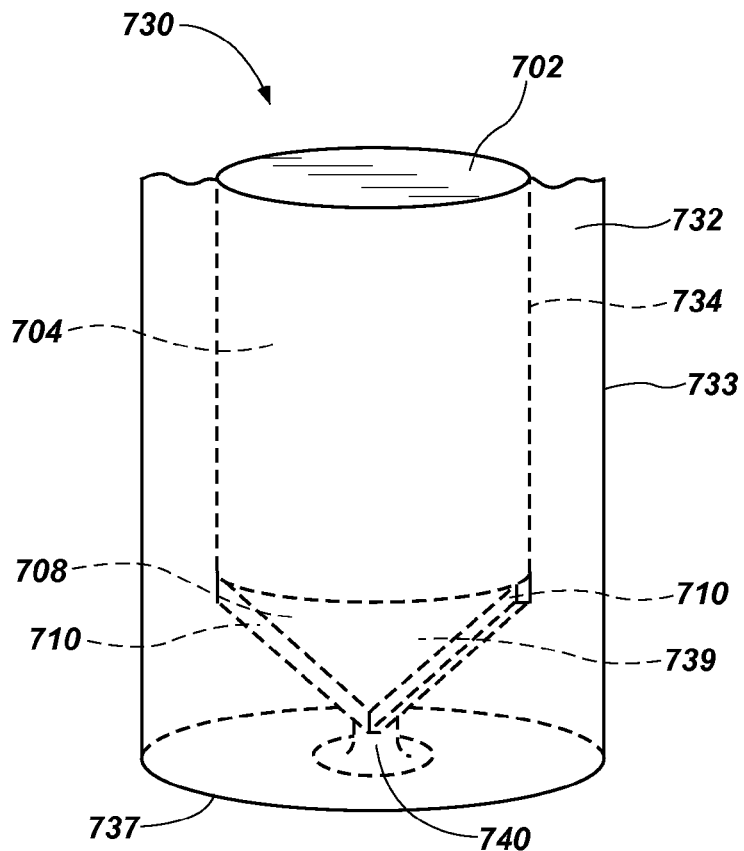
FIG. 7C is an isometric view of a mold assembly including the substrate and mold from FIG. 7A.
Figure 7D:
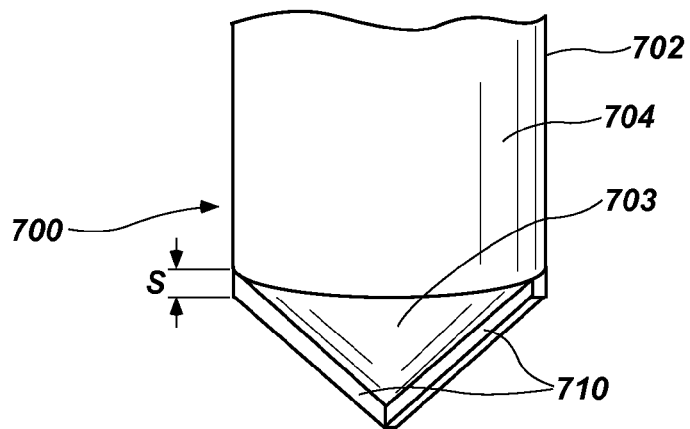
FIG. 7D is an isometric view of a cutting tool formed using the mold assembly of FIG. 7C.

Referring to FIGS. 7A-7D, a cutting tool 700 (as shown in FIG. 7D) configured as a drill may be made using a mold 732. The mold 732 may include an outer surface 733, a base surface 737, and an upper mold surface 735. The mold 732 may have a mold cavity 734 (e.g., molded or machined) therein. The mold cavity 734 may include an end-region recess 739 at a distal end (e.g. deepest extent) of the mold cavity, and one or more flute recesses 736 extending from the end-region recess 739 and optionally, on any other portion of the mold cavity 734 (e.g., interior surface). The end-region recess 739 may exhibit any geometric configuration such as, but not limited to, conical, domed, pyramidal, stepped, or combinations thereof. The one or more flute recesses 736 may extend from a center point of the end-region recess 739 to an outer lateral portion of the end-region recess 739, or may extend from a point at least intermediate to the center of the end-region recess 739 and an outer lateral portion of the end-region recess 739 to the outer lateral portion of the end-region recess 739. The one or more flute recesses may extend longitudinally away from the end-region recess by a standoff distance S, such as any of the distances S described herein.

In some embodiments, such as shown in FIG. 7B, the flute recesses 736 may align with each other along a center line C (e.g., bisecting the interfacial surface into equal halves) of the end-region recess 739 to extend co-linearly across the end-region recess 739. The flute recesses 736 may be positioned off of the center line C in the end-region recess 739, such as in a staggered configuration in which each PCD portion abuts the center line C. In embodiments having more than two flute recesses, the flute recesses 736 may be positioned radially around the end-region recess 739 in an equidistant manner, and may be centered on one of a plurality of center lines C radially corresponding to the flute recess 736, spaced off of the center line C radially corresponding to the flute recess 736 a distance, or abut the center line C radially corresponding to the flute recess 736. The flute recesses 736 may be positioned on the end-region recess 739 to create a PCD portion 710 defining a cutting edge positioned to correspond to the leading side of rotation of a cutting tool.

Optionally, at least one sprue hole 740 may be formed in a surface of the mold 732, the sprue hole extending to at least one of the at least one flute recesses 736. The sprue hole 740 may extend through the base surface 737, the upper mold surface 735, or the outer surface 733. The sprue hole 740 may be used to pour or otherwise position diamond material (e.g., diamond powder) in the flute recesses 736 once the substrate 702 is positioned in the mold cavity 734. As shown in FIG. 7C, the sprue hole 740 may be used to position diamond material in an angled cavity when the substrate is positioned therein in order to allow the diamond material to remain in the flute recess 736 alone. For example, if the diamond material is poured into the flute recesses 736 in the end-region recess 739 being configured at an angle, the diamond material may flow to the bottom of the end-region recess 739 rather than remain in the flute recesses 736. In order to overcome this problem, the entire mold may be oriented (e.g., tipped upside down) such that diamond material (e.g., diamond powder) may be poured into the sprue hole 740 so that the diamond material may fill the flute recesses 736 therein. The diamond material may be compacted or otherwise agitated as described herein to ensure substantially complete occupation of the flute recesses. In another embodiment, shear-compacted diamond material or diamond material with a binder may be positioned in flute recesses 736 and then substrate 702 may be positioned in the mold.

As described in more detail below, the diamond material may be inserted into the flute recesses 736 prior to inserting the substrate 702 into the mold cavity 734. Such diamond material may be pre-compacted into the flute recesses 736 (e.g., cold pressed). In some embodiments, the diamond material such as a diamond powder may have a binder material therein, such as a material to make the diamond powder malleable while the binder is wet and at least temporarily bond to itself and a surface upon curing. The diamond material may be encapsulated by or in another material at the flute recesses 736 (e.g., a layer of material holding the diamond material in the flute recess, or a tube filled with diamond material such as diamond powder inserted (e.g., compressed, tension fit, or compacted) into the flute recess 736). In an embodiment, after temporarily bonding the diamond material to the substrate, the mold may be removed to expose the substrate having diamond material thereon, the substrate and diamond material may then be wrapped with in a metal foil and salt for pre-compaction. The resulting assembly may then be subjected to HPHT conditions such as any described herein.

In an embodiment, a method of forming a cutting tool using the mold assembly 730. The mold assembly 730 may include the mold 732 having the mold cavity 734, wherein the mold cavity 734 may include the end-region recess 739 at a distal extent of the cavity 734. The mold 732 may further include at least one flute recess 736 therein. The mold assembly 730 may include the substrate 702 positioned within the mold cavity 734, effective to contact the inner surface of the mold 732 substantially continuously throughout, except for the flute recesses therein. Diamond material such as diamond powder may be positioned within the flute recesses 736 by pouring the diamond powder into the flute recesses 736 directly or through a sprue hole, pre-compacting the diamond material into the mold recesses prior to insertion of the substrate, or using a material to hold the diamond material in the flute recesses 736. The mold 732 may be formed using any of the materials and/or techniques for forming a mold disclosed herein. The mold assembly 730 may be placed in a refractory metal container which may be placed in a pressure transmitting medium, which is loaded into a press, wherein the assembly is subjected to HPHT conditions sufficient to sinter the diamond material to the surface of the substrate. The refractory metal can, pressure transmitting medium, and HPHT process may be substantially similar to any described herein.

After HPHT processing, the mold material may be removed from the substrate, by any of the removal techniques described herein, thereby exposing the cutting tool 700. The cutting tool 700 may include the substrate 702 body having a surface 704, an end surface 703 and at least one PCD portion 710 thereon. The geometry of the end surface 703 may resemble any of the geometries described herein for the end-region recess 739. The geometry of the substrate (size) may substantially correspond to the geometry of any substrate described herein. The standoff distance may be any standoff distance recited herein. The number and position of PCD portions 710 may correspond to any position and/or number of flute recesses recited herein.

In an embodiment (not shown), a mold and corresponding substrate may have alignment protrusions and recesses substantially similar to those described above. The alignment recesses and protrusions may be used to align debris slots in the substrate with the flute recesses of the mold. For example, a cutting tool may include a substrate having at least one debris slot therein extending (e.g., helically or linearly) along a surface thereof to an apex (e.g., center) of an end surface of the substrate, at least one alignment protrusion extending from the surface of the substrate (e.g., laterally extending), and at least one PCD portion adjacent to the debris slots. The corresponding mold, from which the cutting tool may be formed, may include a mold cavity including an end-region recess having flute recesses extending therefrom, an alignment recess corresponding to the alignment protrusion on the substrate, and optionally a sprue hole. The debris slots, alignment recesses and protrusions, and remaining portions of the molds or substrates may be substantially similar to any described herein.

Referring to FIGS. 8A-8C, a cutting tool may be formed by positioning at least one diamond material tube 870 (or other diamond material flute volume) having at least one wall 872 at least partially enclosing diamond material (e.g., diamond particles or powder) therein around a substrate 802, which may be placed in a mold 832 to form a mold assembly 830. The mold assembly 830 may be subjected to HPHT conditions effective to melt a catalyst material forming the at least one wall 872 of the diamond material tube 870, bond the diamond particles in the diamond material 808 together, and bond the resulting PCD portion 810 to the substrate 802.

The material used to form the at least one wall 872 of the diamond material tube 870 should be malleable enough to extend or otherwise wrap around substrates having a small diameter (e.g., about 1 mm) without breaking or tearing. Suitable materials may include iron, cobalt, nickel, tungsten carbide embedded in cobalt, alloys or mixtures of the foregoing, or any other material that may catalyze diamond-to-diamond bonding while remaining compliant enough to wrap around a small diameter without breaking or tearing. In embodiments, the at least one wall 872 material may be substantially free of any plastics, polymer, or wax, or use very little plastic, polymer, or wax therein in order to eliminate or reduce contamination or fowling of the PCD body to be formed due to infiltration of plastic material. For example, the diamond material tube 870 (e.g., flute tube) may be provided or formed without any plastic, polymer, or wax therein.

As shown in FIGS. 8B and 8C, the diamond material tube 870 may have an outside diameter ("OD") and an inside diameter ("ID"); the difference of which is the wall thickness. The diamond material tube 870 may have an OD substantially equal to or slightly larger (e.g., 10 percent larger) than any of the standoff distances S recited herein. In an embodiment, the ID of the diamond material tube 870 may be about any size of standoff distance S recited herein less two times any wall thickness recited herein. The inside diameter of the tube may filled with any diamond material, such as diamond powder, as described herein.

In some embodiments, the at least wall 872 of the diamond material tube 870 may be as thin as possible without causing breaking or tearing in the resulting diamond material tube 870, such as about 50 µm thick or more, about 150 µm to about 1 mm, about 250 µm to about 800 µm, about 250 µm to about 600 µm, about 150 µm to about 500 µm, about 250 µm, or about 500 µm.

While shown as substantially cylindrical, the cross sectional shape of the diamond material tube 870 may have a generally polygonal cross sectional shape, generally elliptical cross-sectional shape, oblong cross sectional shape, a substantially flattened cross sectional shape, or combinations of the foregoing. The diamond material tube 870 may exhibit more than one cross-sectional shape along the length thereof. For example, one end of the diamond material tube 870 may exhibit a substantially rectangular cross-sectional shape, wherein another end of the diamond material tube 870 may exhibit a substantially round cross-sectional shape. It is understood that the process of wrapping and or attaching a diamond material tube to a substrate or mold may deform the shape and/or diameter of the diamond material tube to some extent.

The diamond material tube 870 may be provided or may be formed using a tube having a desired cross-sectional size. For example, the diamond material tube 870 may be made using tape, a strip, a foil, or a sheet comprised of the materials stated above useful for forming one or more walls 872. The tape, strip, foil, or sheet width may be equal to or greater than the circumference of any diamond material tube 870 size recited herein (as determined by the outside diameter measurements recited herein). The thickness of the tape, strip, foil, or sheet may be equal to any of the wall thicknesses recited above. In an embodiment, tape, strip, foil, or a sheet (e.g., such as comprising cobalt), may exhibit a thickness of about 250 μm and width of about 2 mm or more. Diamond material 808 (e.g., diamond powder) may be poured or otherwise positioned centrally relative to the width of the tape, strip, foil, or sheet. The sides of the tape, strip, foil, or sheet may then be folded, positioned, or wrapped around the diamond material 808 to form the diamond material tube 870 having diamond material 808 therein. The sides of the tape, strip, foil, or sheet may overlap each other to ensure the diamond material 808 does not fall out of the diamond material tube 870 during use. The width of the tape, strip, foil, or sheet may be selected to overlap (e.g., wrap around or surround) the diamond material 808 more than one time. In an embodiment, a portion (e.g., length) of tape, strip, foil, or sheet may have diamond material disposed along a portion intermediate to the sides and/or ends thereof. Another portion of tape, strip, foil, or sheet may be placed over top of the diamond material and first portion of tape, strip, foil, or sheet sufficient to cover the diamond material and at least partially overlap the first portion of tape, strip, foil, or sheet. The two portions of tape, strip, foil, or sheet may be twisted, folded, swaged, deformed, or wrapped around each other to seal the diamond material inside. Other types of diamond material flute volumes may be employed besides the illustrated diamond material tube 870. In some embodiments, the at least one diamond material tube 870 may be replaced by at least one preformed diamond flute volume including diamond powder that has been shear compacted with a suitable polymeric binder. In such an embodiment, the at least one preformed diamond flute volume may be a substantially uniform body that may be bent like a tube. Suitable green tapes and other diamond products are commercially available from Ragan Technologies Inc. of Winchendon, Mass. using High Shear Compaction ("HSC™") process(es).

As shown in FIGS. 8A and 8D, the at least one diamond material tube 870 may be positioned around or adjacent to the substrate 802 (e.g., helically, or longitudinally). The diamond material tube 870 may be temporarily attached to the surface 804 of the substrate 802 by at least attaching discrete (e.g., small) portions of the diamond material tube 870 to the substrate 802 by tack welding, adhesive bonding, inductive heating, laser tacking, or other suitable methods. Once the at least one diamond material tube 870 is positioned on the substrate 802, the at least one diamond material tube 870 and substrate 802 may be coated with a refractory metal foil or refractory paint or paste capable of withstanding sintering pressures and temperatures, such as by way of non-limiting example, Pyro-Paint™ produced by Aremco Products Inc., of New York or one of the aerosol refractory paints (e.g., Z aerosol) produced by ZYP Coatings, Inc., of Tennessee. The at least one diamond material tube 870 and substrate 802 may then be pre-compacted in a mold material, such as any described herein to form the mold assembly 830. The mold assembly 830 may be loaded into a refractory metal can, or may be loaded directly into a pressure transmitting medium, all of which may be subjected to HPHT conditions sufficient to sinter diamonds particles, whereby the at least one wall 872 may at least partially melt and the catalyst material therein may catalyze diamond-to-diamond bonding, and the resulting PCD portions may bond to the surface 804 of the substrate 802 upon cooling.

As shown in FIG. 8E, a cutting tool 800 formed according to the foregoing may include PCD portions 810 resembling flutes extending around and bonded to the surface 804 of the substrate 802. The surface 804, as shown, may be substantially cylindrical and PCD portions 810 may be bonded thereto. Optionally, the PCD portions 810 may be positioned on the end surface 803 of the substrate 802, in addition to or alternatively to being positioned on the surface 804 (e.g., lateral or side surface) of the substrate 802. The PCD portions 810 formed from the diamond material tube 870 may require surface finishing to form a final shape, diameter, or cutting edge. For example, a substantially round diamond material tube 870 may form a substantially rounded PCD portion 810, which may require further processing to form a sharp cutting edge thereon, or square up the PCD portions 810. Surface finishing may be accomplished using milling techniques, EDM, lasing, grinding, lapping, or combinations of the foregoing.

In an embodiment, such as shown in FIG. 8F, the mold 832 may have flute recesses 836 formed in a mold cavity 834. The mold cavity 834 and flute recesses 836 may be substantially similar to and may be made in substantially the same manner as any described herein. Diamond material tube(s) 870 may be positioned within the flute recesses 836 prior to insertion of a substrate 802 into the mold cavity 834. After insertion of the substrate 802 into the mold cavity 834, the assembly may be HPHT processed as previously described.

In an embodiment, the diamond material tubes 870 may be placed in the flute recesses 836 with a binder material on and/or in one or both of the diamond material tubes 870 and flute recesses 836. As shown in FIG. 8G, the substrate 802 may be positioned in the mold 832 having diamond material tubes 870 in the flute recesses 836 therein prior to curing to form the mold assembly 830. After curing, the binder material may temporarily or weakly attach the diamond material tube 870 to the surface 804 of the substrate 802. The mold material may be removed (e.g., stripped away), after which the substrate 802 including the diamond material tubes 870 thereon may be encased or coated in a refractory metal (e.g., a foil). Then, an additional pressure transmitting material 880 (e.g. pyrophyllite, or salt) may be positioned about the assembly, after which the assembly may be subjected to HPHT conditions effective to sinter the diamond particles in the diamond material and bond the resulting PCD portion to the substrate 802. In an embodiment, the mold material may be rubber, latex, or mixtures comprising the same (e.g., rubber mold), wherein after curing the diamond material tubes 870, the rubber mold may be removed from (e.g., stretched or deformed off) the substrate and diamond material tubes for reuse. Rubber molds may be used in any process described herein where the mold material is removed from the substrate prior to sintering.

A cutting tool substantially similar to that depicted in FIG. 3 may be molded or otherwise manufactured using any of the processes described herein, including forming recesses for thread cutting bodies and/or finishing PCD portions to form thread cutting bodies therein.

Figure 9:
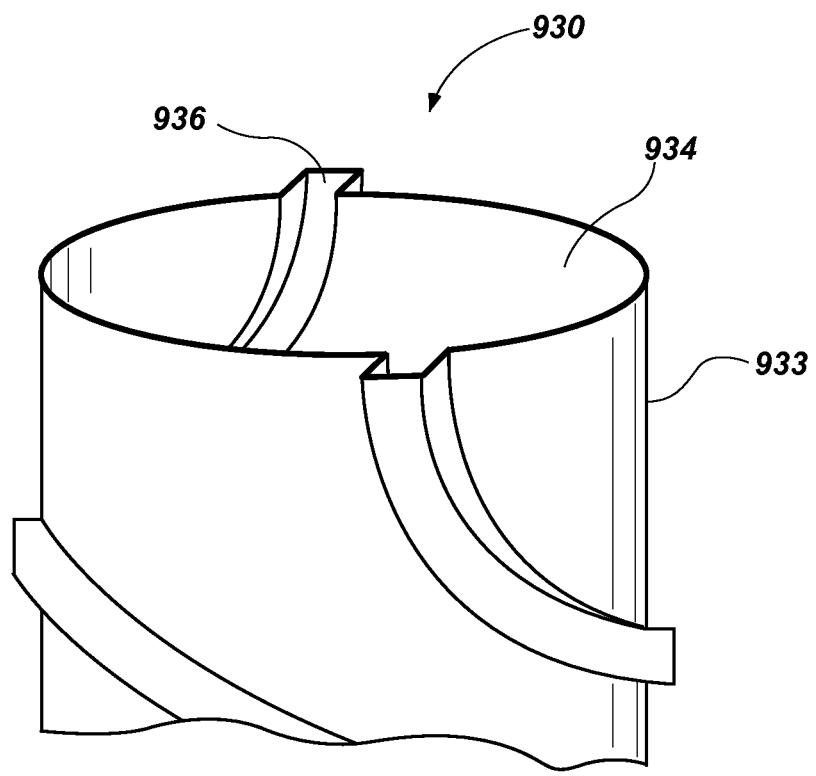
FIG. 9 is an isometric view of a mold according to an embodiment.

Referring to FIG. 9, in an embodiment, a mold 930 may include or may be formed from a metallic can defining a mold cavity 934 having at least one flute recess 936 therein. The metallic can may comprise any refractory metal, non-refractory metal, or alloys of any of the foregoing. In an embodiment, the metal can may be formed with a relatively thin wall thickness of metallic material such that the mold cavity 934 may substantially define the geometry of a sintered cutting tool. In an embodiment, the metal can may include tungsten, cobalt, titanium, steel, nickel, or combinations of the foregoing. In an embodiment as shown in FIG. 9, the surface 933 (e.g., outer surface) of the mold 930 may be substantially congruent with the mold cavity. In an embodiment (not shown), the surface 933 may be incongruent with the mold cavity, such as a mold 930 having a generally cylindrical mold cavity 934 and a generally cuboid surface 933. In some embodiments, the mold 930 comprising the metallic material may be formed by isostatic pressing, molding, or 3-D printing a metal can in the shape of a positive form of a substrate having PCD portions thereon. 3-D printing (e.g., laser sintering, metal sintering) of metals and refractory metals may be achieved by using a suitable 3-D metal printer, such as, but not limited to those available from 3D Systems Corp. of U.S.A, EOS GmbH of Germany, Arcam AB of Sweden, or ExOne Co. of the U.S.A. and Japan. The average wall thickness of the 3-D printed metal can may be about 0.003 inches or more, such as about 0.003 inches to about 0.02 inches, about 0.005 inches to about 0.05 inches, about 0.005 inches to about 0.01 inches, about 0.011 inches to about 0.015 inches, about 0.005 inches, about 0.011 inches, about 0.012 inches, about 0.014 inches, about 0.015 inches, or less than about 0.015 inches. For example, a Ti-6Al-4V alloy (e.g., Grade 5) or other titanium alloy may be printed in a metal can shape substantially as shown in FIG. 9 or any other suitable shape. The Ti-6Al-4V alloy can may exhibit an average wall thickness of about 0.011 inches to about 0.015 inches (e.g., about 0.014 inches). Other metals (e.g., refractory metals, or refractory metal containing alloys) may be used to 3-D print a metal can as described herein.

In an embodiment, a mold 930 may be produced by 3-D printing, and then the surface (e.g., inner surface and/or outer surface) of the mold 930 may be coated with a refractory metal. Refractory metal coating techniques may include chemical vapor deposition ("CVD"), physical vapor deposition ("PVD"), electroplating, or other suitable technique for depositing a refractory metal on a surface. Optionally, the original mold material may be removed leaving the refractory metal in place.

In an embodiment of a method of making a cutting tool, a mold in the form of a metal container (e.g., refractory metal can) may be formed by creating a positive form of a cutting tool. The metal container may be formed by placing a finished cutting tool inside of the metal container somewhat larger than the cutting tool. Optionally, the metal container may be placed in a pressure transmitting medium. The mold may be made by compressing the metal container around the cutting tool until the metal container takes the shape of the outer surface of the cutting tool. The cutting tool may be removed from the compressed metal container (i.e., mold. The cutting tool may be removed by withdrawing the cutting tool out through the compressed metal container (such withdrawal may require twisting if cutting tool includes helical flutes). Removal may include leaching the cutting tool out of the mold, shot blasting the cutting tool out, stretching the mold, or cutting the mold into a multiplicity of pieces sufficient to be reused as the mold once combined again (e.g., cut in half longitudinally).

The mold 930 may have a wall thickness sufficient to allow HPHT conditions to apply pressure to the contents thereof while being resilient enough to stand on its own. The wall thickness may be comparable to or thicker than wall thickness of the diamond tube walls described herein.

In an embodiment, a mold, such as any described herein, may be include a ceramic material (e.g., HBN containing ceramic or alumina). For example, the ceramic material may be 3-D printed in the shape of any mold described herein.

Molds and methods of making and using the molds, substantially similar to any described herein, may be used to form PDCs having features standing off of the PCD body or substrate therein, such as for example, those depicted in FIGS. 4A-4D and 10B. In an embodiment, such as shown in FIG. 10A, a mold 1032a may have a mold cavity 1034a therein including a PCD body cavity or recess 1058a and at least one standing feature recess 1059a extending from the PCD body cavity or recess 1058a. The PCD body cavity or recess 1058a may exhibit a geometry configured to produce any of the PCD bodies 406a-506c or any of the variants described in relation thereto, including but not limited to, PCD body size, shape, standing features, orientation on the substrate, and combinations thereof. The standing feature recess 1059a may be configured to produce any of the standing features 419 or variations thereof, including but not limited to, shape, size, orientation, position in relation to PCD body, number, or combinations of the forgoing. The mold 1032a may be formed using any of the techniques and materials described herein without limitation. An assembly for forming a PCD according to FIGS. 4A-4D may be made using any substrate as described herein including materials, sizes, shapes, and combinations thereof. The assembly may be placed in a refractory metal container and/or in a pressure transmitting medium substantially similar to any described herein. The assembly may be subjected to HPHT conditions substantially similar to any of those described herein. After the HPHT processing, the mold material may be removed to reveal the PDC.

A cutting tool formed according to the preceding process and using the mold depicted in FIG. 10A may resemble the cutting tool 1000 depicted in FIG. 10B. The cutting tool 1000 may be configured as a PDC including a PCD body 1006a having a standing feature 1019a extending therefrom. The cutting tool 1000 may further include a substrate 1002 having a surface 1004 (e.g., outer or lateral surface) and an interfacial surface 1003 bonded to the PCD body 1006a. In some embodiments, PDCs and PCD bodies formed using molds and molding techniques described herein may resemble any of those described herein, including variations thereof.

In an embodiment, such as that shown in FIG. 10C, a mold 1032c may include an outer surface 1033c, an upper mold surface 1035b, a mold cavity 1034c, and optionally, at least one sprue hole (not depicted). The mold cavity 1034c may include a PCD body cavity 1058c and at least one standing feature recess 1059c therein. The standing feature recess may extend from the PCD body cavity 1058c as shown in FIG. 10A or may extend from the inner surface of the mold cavity 1034c adjacent to where the substrate may be positioned in the mold 1032c, such as depicted in FIG. 10C for example. A substrate substantially similar to any described herein may be placed in the mold cavity 1034c. Diamond material may be placed in the PCD body cavity 1058c and the at least one standing feature recess 1059c to form a mold assembly. The mold assembly may be placed in a refractory metal container and/or pressure transmitting medium and the mold assembly may be subjected to HPHT conditions as described herein. The resulting cutting tool may resemble, for example, cutting tool 500c depicted in FIGS. 5C and 5D.

In some embodiments, at least a portion of the diamond material may be placed in the mold prior to and/or subsequent to positioning the substrate in the mold. For example, a portion of diamond material may be positioned in the mold in the PCD body cavity 1058c, then the substrate may then be placed in the mold cavity 1034c, and last a second portion of diamond material may be positioned in the at least one standing feature recesses 1059c. In an embodiment, the diamond material may be positioned in all recesses prior to insertion of the substrate into the mold cavity 1034c. In an embodiment, the diamond material may be positioned in the mold 1032c only after the substrate is positioned therein. The diamond material may be positioned in the mold 1032c by using at least one sprue hole in the mold cavity 1034c.

In some embodiments, any of the mold cavities of the molds disclosed herein may be coated with a refractory metal foil or refractory paint as described above prior to insertion of a substrate and diamond powder therein in order to limit contamination of the PCD. The interior of the mold need not be coated with a refractory metal when the mold material will not affect the quality of or otherwise contaminate the resulting PCD portion or body. For example, when the mold material is HBN, the substrate and diamond powder or flute tube may be placed directly against the mold material. Variations of any of the diamond powders, PCD bodies, molds, mold cavities including recesses therein, mold materials, mold forming techniques, substrates including sizes and materials, and other characteristics related to the molding processes, molds and products thereof may be used interchangeably between the embodiments depicted and/or described herein.

Due to a PCD body containing catalyst material therein, it may exhibit limited thermal stability and wear resistance at elevated temperatures induced during cutting operations. In some embodiments, forming any of the tools recited herein may include at least partially leaching the catalyst material (e.g., cobalt) from the PCD portions of a finished cutting tool. Such leaching may be accomplished by masking (e.g., shielding) the substrate such that only the PCD portions being leached are exposed to the leaching solution, and placing the masked cutting tool into an leaching solution (e.g., acid bath). Gaseous leaching may be used in a manner similar to leaching in liquid. Suitable leaching agents include aqua regia, hydrofluoric acid, hydrochloric acid, nitric acid, phosphoric acid, or combinations of the foregoing, in any desired concentration. Leaching may be carried out in a pressure vessel. Leaching may be carried out at elevated pressures and/or temperatures over ambient pressure and temperature. Leaching may be carried out for a time sufficient to leach the PCD portions to a desired depth. Leaching soak times may be from a few hours to a few weeks or more. Suitable soak times, leaching solutions, pressures, and temperatures may be selected to result in a desired leach depth as measured from the surface of the PCD body therein. Suitable leach depths may be about 100 µm or more, such as about 100 µm to about 2 cm, about 200 µm to about 1 cm, about 100 µm to about 800 µm, about 200 µm to about 600 µm, about 200 µm, or about 400 µm. Any of the cutting tools described herein may exhibit leached PCD portions, and leached PCD portions exhibiting the leach depths described herein. Leached PCD portions leached to a depth as described herein may have an unleached region nearer the substrate. The unleached region(s) having catalyst material therein and an at last partially leached region nearer the surface of the PCD body. After leaching the at least partially leached regions of the PCD portions may exhibit substantially no catalyst material therein, or may exhibit a residual amount of catalyst material therein such as about 0.5 weight % to about 5 weight % of catalyst material therein, about 1 weight % to about 3 weight % of catalyst material therein, about 0.5 weight % to about 2.5 weight % of catalyst material therein, about 1 weight % of catalyst material therein, about 1.5 weight % of catalyst material therein. The depth of the at least partially leached and unleached regions may exhibit thicknesses determined by any combination of leach depths and standoff distances S described herein. Examples of suitable leaching processes include those described in U.S. Pat. No. 8,596,387 issued 3 Dec. 2013; U.S. Provisional Application No. 61/897,764 filed 30 Oct. 2013; and U.S. patent application Ser. No. 13/324,237 filed 13 Dec. 2011; each of which is incorporated herein by this reference, in its entirety.

Figure 11A:
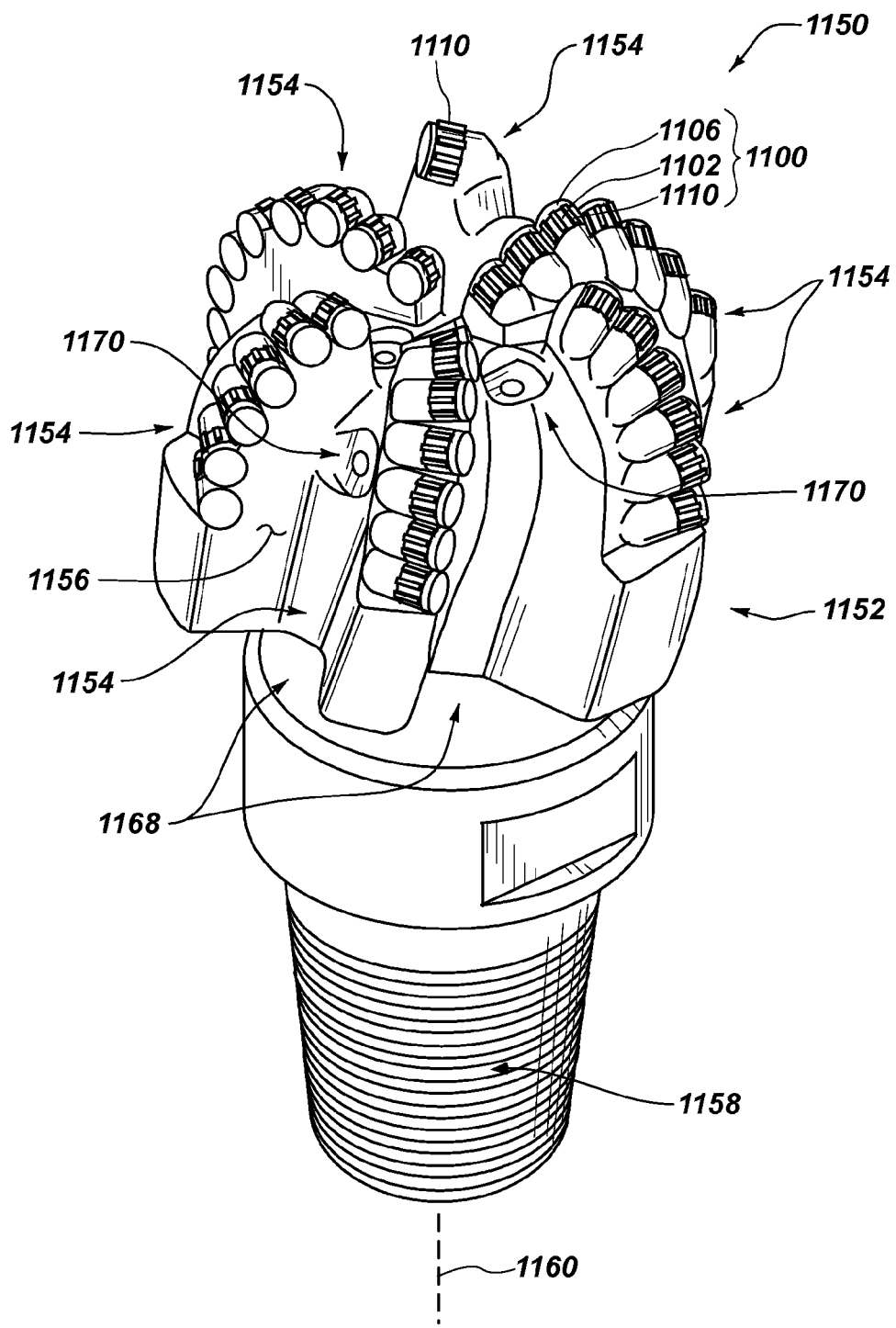
FIG. 11A is an isometric view of an embodiment of a rotary drill bit.
Figure 11B:
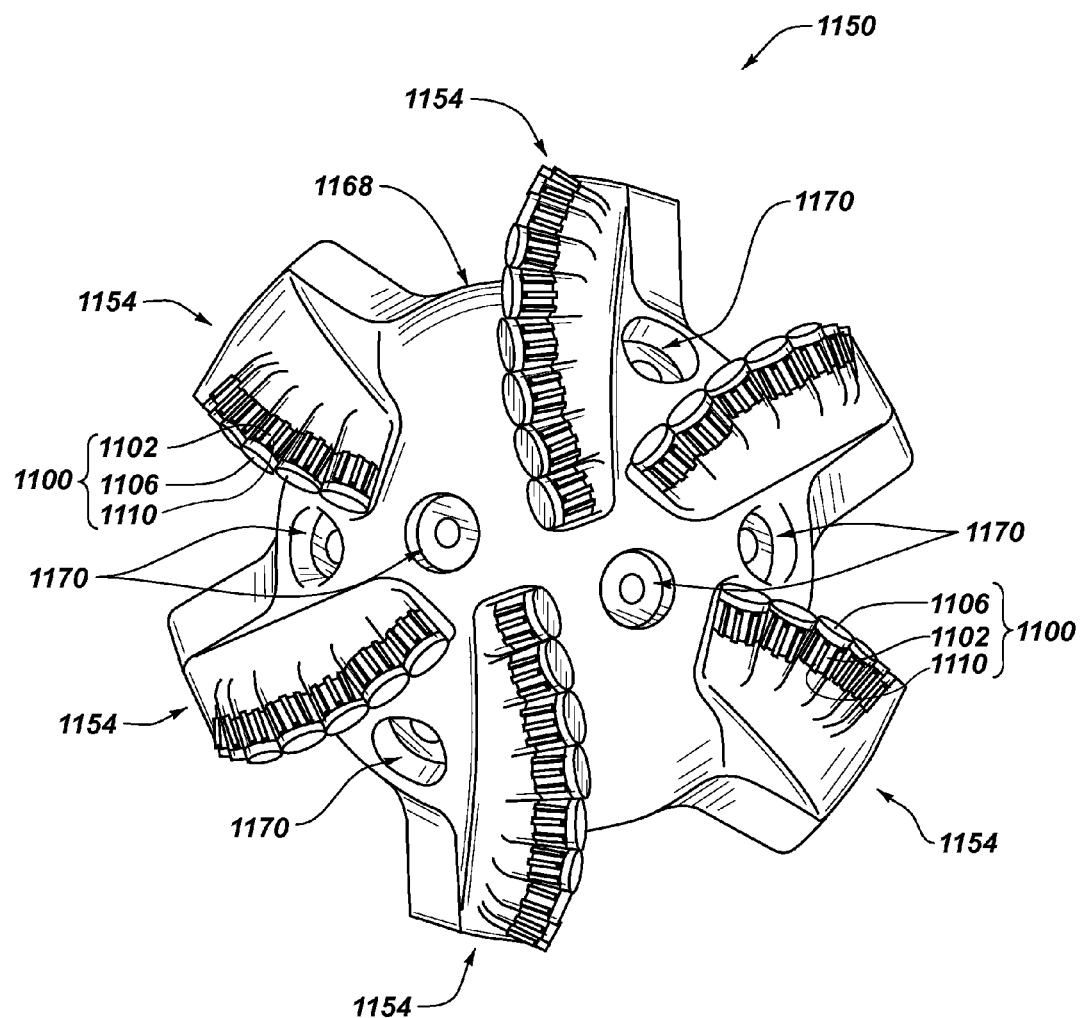
FIG. 11B is a top elevation view of the rotary drill bit shown in FIG. 11A.

The cutting tools (e.g., PDCs) described herein may be used in a variety of applications, such as PCD cutting elements on rotary drill bits. FIG. 11A is an isometric view and FIG. 11B is a top elevation view of an embodiment of a rotary drill bit 1150. The rotary drill bit 1150 includes at least one PCD body, such as a PDC, made or designed according to any of the previously described methods. The rotary drill bit 1150 includes a bit body 1152 that includes radially and longitudinally extending blades 1154 with leading faces 1156, and a threaded pin connection 1158 for connecting the bit body 1152 to a drilling string. The bit body 1152 defines a leading end structure for drilling into a subterranean formation by rotation about a longitudinal axis 1160 and application of weight-on-bit. At least one PDC cutting element 1100, configured according to any of the previously described PDCs and PCD cutting tools (e.g., the PDC shown in FIGS. 5C and 5D) may be affixed to the bit body 1152. With reference to FIG. 11B, each of a plurality of PDC cutting elements 1100 is secured to the blades 1054. For example, each PDC cutting element 1100 may include a PCD body 1106 bonded to a substrate 1102, and a plurality of PCD portions 1110 bonded to and extending laterally from the substrate 1102. More generally, the PDC cutting elements 1100 may include any PCD element disclosed herein, without limitation. Also, circumferentially adjacent blades 1154 so-called junk slots 1168 are defined therebetween, as known in the art. Additionally, the rotary drill bit 1150 may include a plurality of nozzle cavities 1170 for communicating drilling fluid from the interior of the rotary drill bit 1150 to the PDC cutting elements 1000.

FIGS. 11A and 11B merely illustrate one embodiment of a rotary drill bit that employs at least one PDC cutting element that includes a PCD body and substrate configured and fabricated in accordance with the disclosed embodiments, without limitation. The rotary drill bit 1150 is used to represent any number of earth-boring tools or drilling tools, including, for example, core bits, roller-cone bits, fixed-cutter bits, eccentric bits, bicenter bits, reamers, reamer wings, or any other downhole tool including superabrasive compacts, without limitation.

The PCD bodies and PDCs disclosed herein may also be utilized in applications other than cutting technology. For example, the disclosed PCD bodies and/or PDCs may be used in wire dies, bearings, artificial joints, inserts, cutting elements, and heat sinks Thus, any of the PCD bodies disclosed herein may be employed in an article of manufacture including at least one superabrasive element or compact.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of making a polycrystalline diamond ("PCD") structure, the method comprising:
   providing a substrate having a surface;
   positioning at least one diamond material flute volume including at least one diamond material tube including diamond particles, the at least one diamond material tube in contact with a portion of the surface of the substrate; and
   subjecting the substrate and the at least one diamond material flute volume to a high-pressure/high-temperature ("HPHT") process effective to sinter the diamond particles to form a PCD flute volume and bond the PCD flute volume.

2. The method of claim 1, wherein the at least one diamond material tube includes a cobalt-containing tube.

3. The method of claim 1, further comprising attaching at least one portion of the PCD flute volume to the substrate using at least one of induction heating, laser tacking, adhesive, or a binder material.

4. The method of claim 1, wherein the at least one diamond material flute volume includes a plurality of shear compacted diamond particles.

5. The method of claim 1, wherein positioning the at least one diamond material flute volume includes positioning at least one preformed diamond volume generally helically around at least a portion of the substrate.

6. The method of claim 1, further comprising:
   removing mold material from around the PCD flute volume and the substrate;
   processing the PCD flute volume to a final dimension using at least one of milling, grinding, lapping, electro-discharge machining, or lasing; and
   at least partially leaching the PCD flute volume to a selected depth therein.

* * * * *